(12) United States Patent
Carolan et al.

(10) Patent No.: US 11,790,221 B2
(45) Date of Patent: Oct. 17, 2023

(54) QUANTUM OPTICAL NEURAL NETWORKS

(71) Applicant: Massachusetts Institute of Technology, Cambridge, MA (US)

(72) Inventors: Jacques Johannes Carolan, Cambridge, MA (US); Gregory R. Steinbrecher, Brookline, MA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 705 days.

(21) Appl. No.: 16/826,364

(22) Filed: Mar. 23, 2020

(65) Prior Publication Data

US 2020/0372334 A1    Nov. 26, 2020

Related U.S. Application Data

(60) Provisional application No. 62/851,784, filed on May 23, 2019.

(51) Int. Cl.
*G06N 3/067* (2006.01)
*G06N 10/00* (2022.01)
*G06N 3/04* (2023.01)
*G02F 1/35* (2006.01)

(52) U.S. Cl.
CPC ............ *G06N 3/067* (2013.01); *G02F 1/35* (2013.01); *G06N 3/04* (2013.01); *G06N 10/00* (2019.01); *G02F 2203/50* (2013.01)

(58) Field of Classification Search
CPC . G02F 1/35; G06N 3/04; G06N 3/067; G06N 10/00
See application file for complete search history.

(56) References Cited

U.S. PATENT DOCUMENTS

2017/0351293 A1* 12/2017 Carolan ............... G06N 3/0675
2018/0211158 A1*  7/2018 Shainline ............ G06N 3/049

OTHER PUBLICATIONS

Zuo, Ying, et al. "All Optical Neural Network with Nonlinear Activation Functions." arXiv preprint arXiv:1904.10819 (Apr. 2019). (Year: 2019).*
Williamson, Ian AD, et al. "Reprogrammable Electro-Optic Nonlinear Activation Functions for Optical Neural Networks." arXiv preprint arXiv:1903.04579 (Mar. 2019). (Year: 2019).*
(Continued)

*Primary Examiner* — Benjamin P Geib
(74) *Attorney, Agent, or Firm* — Smith Baluch LLP

(57) ABSTRACT

Many of the features of neural networks for machine learning can naturally be mapped into the quantum optical domain by introducing the quantum optical neural network (QONN). A QONN can be performed to perform a range of quantum information processing tasks, including newly developed protocols for quantum optical state compression, reinforcement learning, black-box quantum simulation and one way quantum repeaters. A QONN can generalize from only a small set of training data onto previously unseen inputs. Simulations indicate that QONNs are a powerful design tool for quantum optical systems and, leveraging advances in integrated quantum photonics, a promising architecture for next generation quantum processors.

20 Claims, 17 Drawing Sheets

(56) References Cited

OTHER PUBLICATIONS

Zhang, Qun-Yong, Ping Xu, and Shi-Ning Zhu. "Quantum photonic network on chip." Chinese Physics B 27.5 (2018): 054207. (Year : 2018).*
Aaronson et al., "The computational complexity of linear optics." Proceedings of the forty-third annual ACM symposium on Theory of computing. 2011. 10 pages.
Aaronson, "Read the fine print." Nature Physics 11.4 (2015): 291-293.
Abrams et al., "Quantum algorithm providing exponential speed increase for finding eigenvalues and eigenvectors." Physical Review Letters 83.24 (1999): 5162. 4 pages.
Arjovsky et al., "Unitary evolution recurrent neural networks." International Conference on Machine Learning. 2016. 9 pages.
Aspuru-Guzik et al., "Photonic quantum simulators." Nature physics 8.4 (2012): 285-291.
Bagherian et al., "On-chip optical convolutional neural networks." arXiv preprint arXiv:1808.03303 (2018). 18 pages.
Barends et al., "Superconducting quantum circuits at the surface code threshold for fault tolerance." Nature 508.7497 (2014): 500-503.
Barto et al., "Neuronlike adaptive elements that can solve difficult learning control problems." IEEE Transactions on Systems, Man, and Cybernetics 5 (1983): 834-846.
Bengio et al., "Greedy layer-wise training of deep networks." Advances in Neural Information Processing Systems. 2007. 8 pages.
Bengio, "Deep learning of representations for unsupervised and transfer learning." Proceedings of ICML Workshop on Unsupervised and Transfer Learning. 2012. 21 pages.
Bernien et al., "Probing many-body dynamics on a 51-atom quantum simulator." Nature 551.7682 (2017): 579-584.
Biamonte et al., "Quantum machine learning." Nature 549.7671 (2017): 195-202. 24 pages.
Boixo et al., "Characterizing quantum supremacy in near-term devices." Nature Physics 14.6 (2018): 595-600.
Buhrman et al., "Quantum fingerprinting." Physical Review Letters 87.16 (2001): 167902. 4 pages.
Cai et al., "Entanglement-based machine learning on a quantum computer." Physical Review Letters 114.11 (2015): 110504. 5 pages.
Capper et al., "DNA methylation-based classification of central nervous system tumours." Nature 555.7697 (2018): 469-474.
Carolan et al., "On the experimental verification of quantum complexity in linear optics." Nature Photonics 8.8 (2014): 621. 6 pages.
Carolan et al., "Scalable feedback control of single photon sources for photonic quantum technologies." Optica 6.3 (2019): 335-340.
Carolan et al., "Universal linear optics." Science 349.6249 (2015): 711-716.
Chen et al., "Real-time monitoring and gradient feedback enable accurate trimming of ion-implanted silicon photonic devices." Optics Express 26.19 (2018): 24953-24963.
Chung et al., "A monolithically integrated large-scale optical phased array in silicon-on-insulator CMOS." IEEE Journal of Solid-State Circuits 53.1 (2017): 275-296.
Clements et al., "Optimal design for universal multiport interferometers." Optica 3.12 (2016): 1460-1465.
Cramer et al., "Efficient quantum state tomography." Nature Communications 1.1 (2010): 1-7.
Duan et al., "Scalable photonic quantum computation through cavity-assisted interactions." Physical Review Letters 92.12 (2004): 127902. 4 pages.
Eger et al., "Is it time to swish? Comparing deep learning activation functions across NLP tasks." arXiv preprint arXiv:1901.02671 (2019). 11 pages.
Farhi et al., "A quantum approximate optimization algorithm." arXiv preprint arXiv:1411.4028 (2014). 16 pages.
Farhi et al., "Classification with quantum neural networks on near term processors." arXiv preprint arXiv:1802.06002 (2018). 21 pages.
Gao et al., "Entangling Bosonic Modes via an Engineered Exchange Interaction." arXiv preprint arXiv:1806.07401 (2018). 13 pages.
Garcia-Escartin et al., "Swap test and Hong-Ou-Mandel effect are equivalent." Physical Review A 87.5 (2013): 052330. 10 pages.
Gisin et al., "Quantum communication." Nature Photonics 1.3 (2007): 165. 7 pages.
Glorot et al., "Deep sparse rectifier neural networks." Proceedings of the Fourteenth International Conference on Artificial Intelligence and Statistics. 2011. 9 pages.
Harris et al., "Efficient, compact and low loss thermo-optic phase shifter in silicon." Optics Express 22.9 (2014): 10487-10493.
Harris et al., "Linear programmable nanophotonic processors." Optica 5.12 (2018): 1623-1631.
Harrow et al., "Quantum algorithm for linear systems of equations." Physical Review Letters 103.15 (2009): 150502. 4 pages.
Havlíček et al., "Supervised learning with quantum-enhanced feature spaces." Nature 567.7747 (2019): 209-212.
Heuck et al., "Photon-Photon Interactions in Dynamically Coupled Cavities." arXiv preprint arXiv:1905.02134 (2019). 26 pages.
Hughes et al., "Training of photonic neural networks through in situ backpropagation and gradient measurement." Optica 5.7 (2018): 864-871.
Javadi et al., "Single-photon non-linear optics with a quantum dot in a waveguide." Nature Communications 6 (2015): 8655. 5 pages.
Jing et al., "Tunable efficient unitary neural networks (eunn) and their application to rnns." Proceedings of the 34th International Conference on Machine Learning—vol. 70. JMLR.org, 2017. 9 pages.
Kan et al., "Stochastic global optimization methods part I: Clustering methods." Mathematical Programming 39.1 (1987): 27-56.
Killoran et al., "Continuous-variable quantum neural networks." arXiv preprint arXiv:1806.06871 (2018). 21 pages.
Killoran et al., "Continuous-variable quantum neural networks." Physical Review Research 1.3 (2019): 033063. 21 pages.
Kim et al., "Hybrid integration of solid-state quantum emitters on a silicon photonic chip." Nano Letters 17.12 (2017): 7394-7400.
Kimble, "The quantum internet." Nature 453.7198 (2008): 1023-1030.
Kirchmair et al., "Observation of quantum state collapse and revival due to the single-photon Kerr effect." Nature 495.7440 (2013): 205-209.
Knill et al., "A scheme for efficient quantum computation with linear optics." Nature 409.6816 (2001): 46-52.
Kok et al., "Linear optical quantum computing with photonic qubits." Reviews of Modern Physics 79.1 (2007): 135. 40 pages.
Kourou et al., "Machine learning applications in cancer prognosis and prediction." Computational and Structural Biotechnology Journal 13 (2015): 8-17.
Krastanov et al., "Universal control of an oscillator with dispersive coupling to a qubit." Physical Review A 92.4 (2015): 040303. 5 pages.
Lanyon et al., "Towards quantum chemistry on a quantum computer." Nature Chemistry 2.2 (2010): 106-111.
Lau et al., "Proposal for a scalable universal bosonic simulator using individually trapped ions." Physical Review A 85.6 (2012): 062329. 11 pages.
Lecun et al., "Deep learning." Nature 521.7553 (2015): 436-444.
Lloyd et al., "Quantum generative adversarial learning." Physical Review Letters 121.4 (2018): 040502. 5 pages.
Lloyd et al., "Quantum principal component analysis." Nature Physics 10.9 (2014): 631-633.
Marsili et al., "Detecting single infrared photons with 93% system efficiency." Nature Photonics 7.3 (2013): 210. 5 pages.
Miatto et al., "Hamiltonians for one-way quantum repeaters." Quantum 2 (2018): 75. 8 pages.
Miller, "Device requirements for optical interconnects to silicon chips." Proceedings of the IEEE 97.7 (2009): 1166-1185.
Miller, "Self-configuring universal linear optical component." Photonics Research 1.1 (2013): 1-15.

(56) References Cited

OTHER PUBLICATIONS

Mitarai et al., "Quantum circuit learning." Physical Review A 98.3 (2018): 032309. 6 pages.
Montanaro, "Quantum algorithms: an overview." NPJ Quantum Information 2.1 (2016): 1-8.
Mower et al., "High-fidelity quantum state evolution in imperfect photonic integrated circuits." Physical Review A 92.3 (2015): 032322. 7 pages.
Najafi et al., "On-chip detection of non-classical light by scalable integration of single-photon detectors." Nature Communications 6 (2015): 5873. 8 pages.
Niu et al., "Hardware-efficient bosonic quantum error-correcting codes based on symmetry operators." Physical Review A 97.3 (2018): 032323. 21 pages.
Notaros et al., "Ultra-efficient CMOS fiber-to-chip grating couplers." 2016 Optical Fiber Communications Conference and Exhibition (OFC). IEEE, 2016. 3 pages.
O'Brien et al., "Quantum process tomography of a controlled-NOT gate." Physical Review Letters 93.8 (2004): 080502. 4 pages.
O'Brien, "Optical quantum computing." Science 318.5856 (2007): 1567-1570.
Olson, "The role of complexity theory in quantum optics—a tutorial for BosonSampling." Journal of Optics 20.12 (2018): 123501. 22 pages.
Pant et al., "Rate-distance tradeoff and resource costs for all-optical quantum repeaters." Physical Review A 95.1 (2017): 012304. 14 pages.
Parascandolo e al., "Taming the waves: sine as activation function in deep neural networks." (2016). 12 pages.
Peropadre et al., "Proposal for microwave boson sampling." Physical Review Letters 117.14 (2016): 140505. 6 pages.
Powell, "The BOBYQA algorithm for bound constrained optimization without derivatives." Cambridge NA Report NA2009/06, University of Cambridge, Cambridge (2009): 26-46.
Preskill, "Quantum Computing in the NISQ era and beyond." Quantum 2 (2018): 79. 20 pages.
Radovic et al., "Machine learning at the energy and intensity frontiers of particle physics." Nature 560.7716 (2018): 41-48.
Raghu et al., "On the expressive power of deep neural networks." Proceedings of the 34th International Conference on Machine Learning—vol. 70. JMLR.org, 2017. 8 pages.
Reck et al., "Experimental realization of any discrete unitary operator." Physical Review Letters 73.1 (1994): 58. 6 pages.
Ristè et al., "Demonstration of quantum advantage in machine learning." NPJ Quantum Information 3.1 (2017): 16. 5 pages.
Romero et al., "Quantum autoencoders for efficient compression of quantum data." Quantum Science and Technology 2.4 (2017): 045001. 10 pages.

Salimans et al., "Evolution Strategies as aScalable Alternative to Reinforcement Learning," arXiv:1703.03864v2 [stat.ML] Sep. 7, 2017 (13 pages).
Scheel, "Permanents in linear optical networks." arXiv preprint quant-ph/0406127 (2004). 6 pages.
Schuld et al., "Circuit-centric quantum classifiers." Physical Review A 101.3 (2020): 032308. 8 pages.
Schuld et al., "Quantum machine learning in feature Hilbert spaces." Physical Review Letters 122.4 (2019): 040504. 6 pages.
Seeley et al., "The Bravyi-Kitaev transformation for quantum computation of electronic structure." The Journal of Chemical Physics 137.22 (2012): 224109. 17 pages.
Shapiro, "Single-photon Kerr nonlinearities do not help quantum computation." Physical Review A 73.6 (2006): 062305. 11 pages.
Shen et al., "Deep learning with coherent nanophotonic circuits." Nature Photonics 11.7 (2017): 441. 8 pages.
Shor, "Algorithms for quantum computation: discrete logarithms and factoring." Proceedings 35th annual symposium on foundations of computer science. IEEE, 1994. 11 pages.
Sparrow et al., "Simulating the vibrational quantum dynamics of molecules using photonics." Nature 557.7707 (2018): 660-667.
Steinbrecher et al., "Quantum optical neural networks." NPJ Quantum Information 5.1 (2019): 1-9.
Sun et al., "Single-chip microprocessor that communicates directly using light." Nature 528.7583 (2015): 534-538.
Sze et al., "Efficient processing of deep neural networks: A tutorial and survey." Proceedings of the IEEE 105.12 (2017): 2295-2329.
Timurdogan et al., "Electric field-induced second-order nonlinear optical effects in silicon waveguides." Nature Photonics 11.3 (2017): 200. 8 pages.
Tranter et al., "The B ravyi-K itaev transformation: Properties and applications." International Journal of Quantum Chemistry 115.19 (2015): 1431-1441.
Varnava et al., "How good must single photon sources and detectors be for efficient linear optical quantum computation?. " Physical Review Letters 100.6 (2008): 060502. 4 pages.
Verdon et al., "A universal training algorithm for quantum deep learning." arXiv preprint arXiv:1806.09729 (2018). 83 pages.
Wan et al., "Quantum generalisation of feedforward neural networks." npj Quantum Information 3.1 (2017): 1-8.
Wecker et al., "Solving strongly correlated electron models on a quantum computer." Physical Review A 92.6 (2015): 062318. 24 pages.
Wu et al., "Google's neural machine translation system: Bridging the gap between human and machine translation." arXiv preprint arXiv:1609.08144 (2016). 23 pages.
Zhang et al., "Broadband nonvolatile photonic switching based on optical phase change materials: beyond the classical figure-of-merit." Optics Letters 43.1 (2018): 94-97.
Zhu et al., "A scalable multi-photon coincidence detector based on superconducting nanowires." Nature nanotechnology 13.7 (2018): 596-601.

* cited by examiner

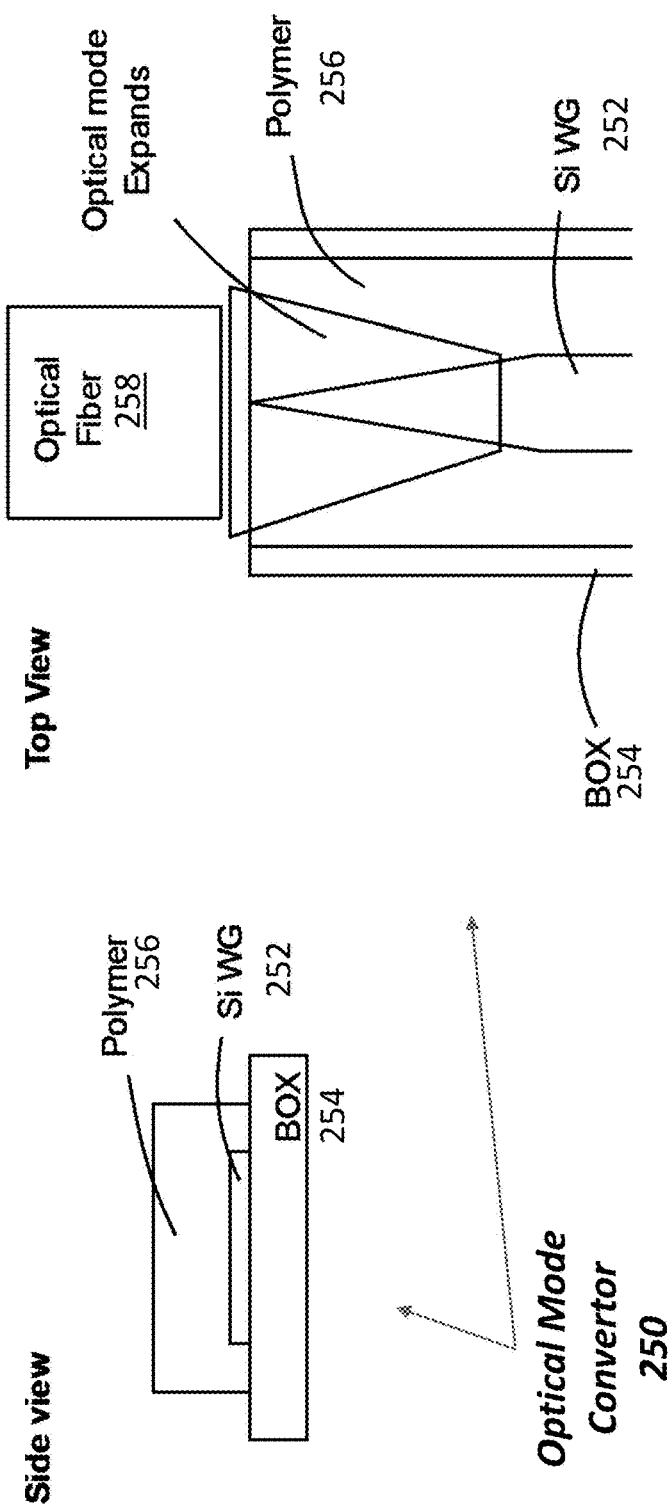

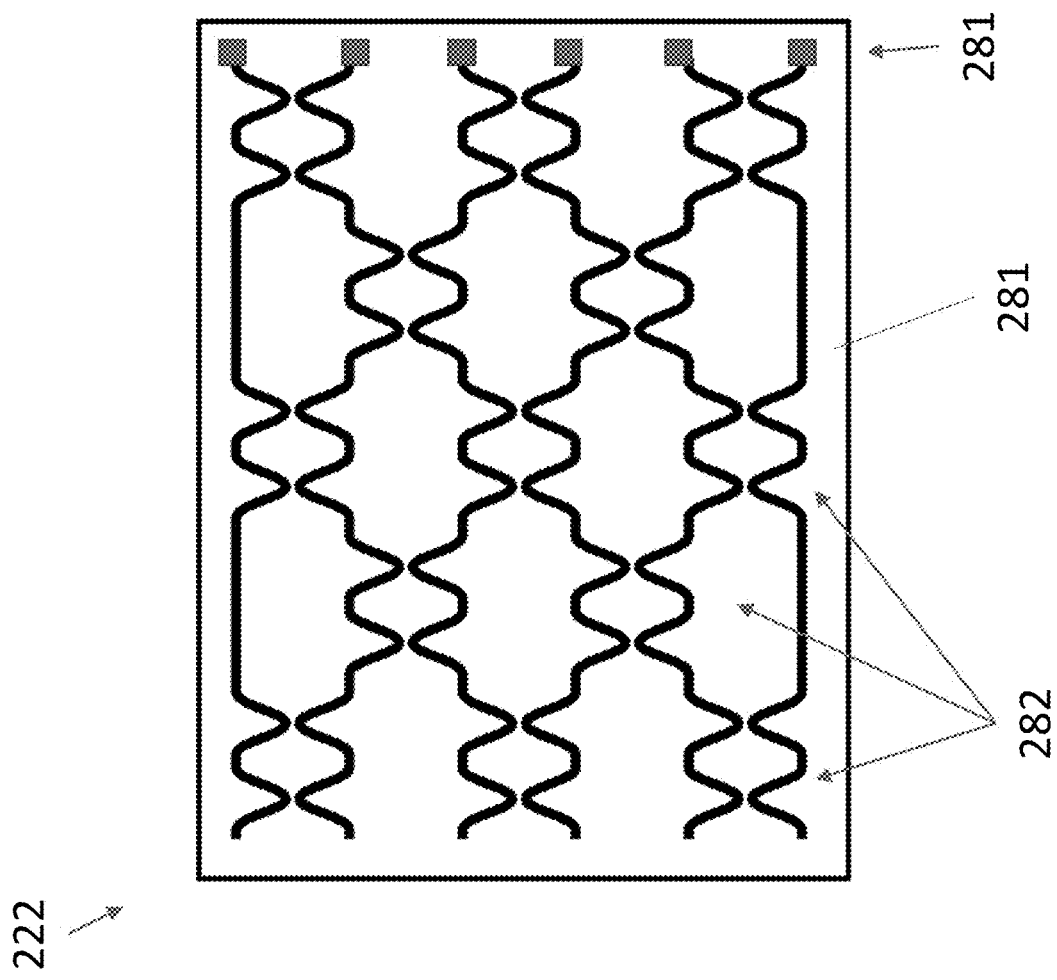

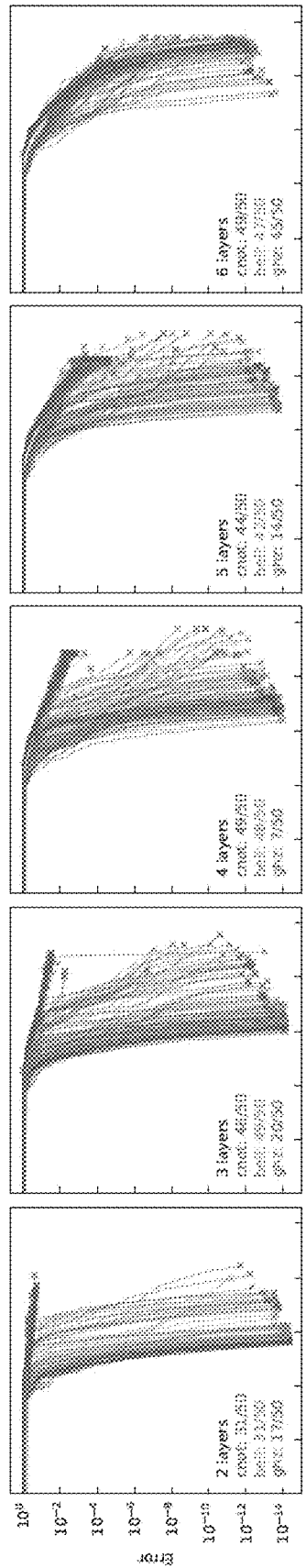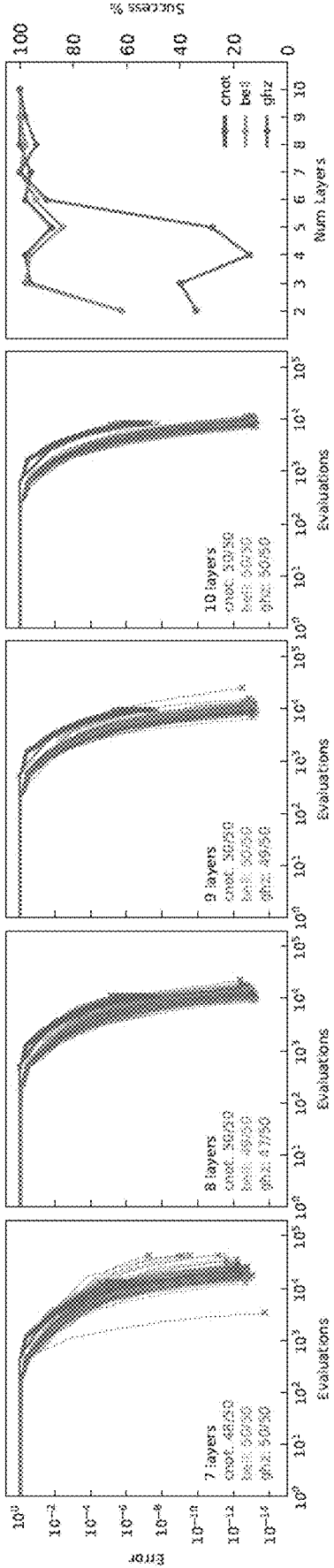
FIG. 3A FIG. 3B FIG. 3C FIG. 3D FIG. 3E
FIG. 3F FIG. 3G FIG. 3H FIG. 3I FIG. 3J

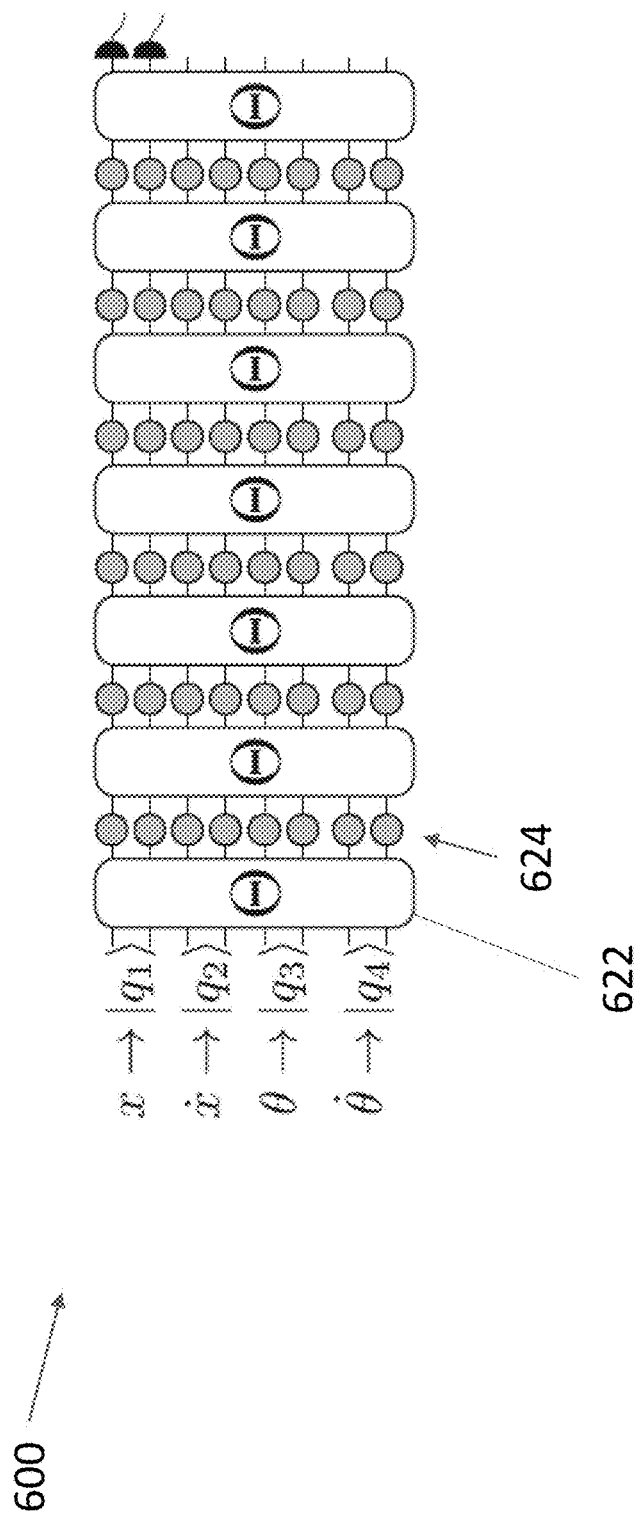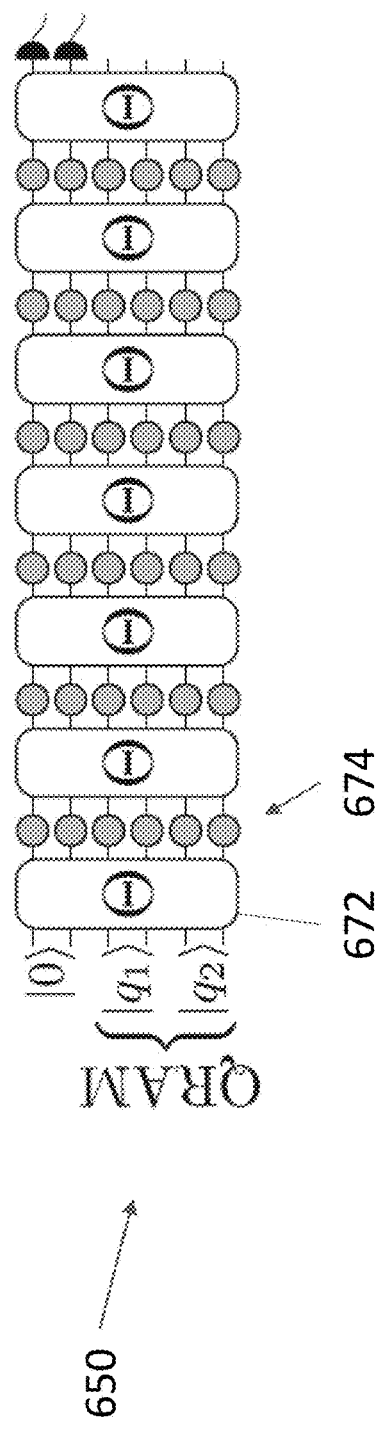

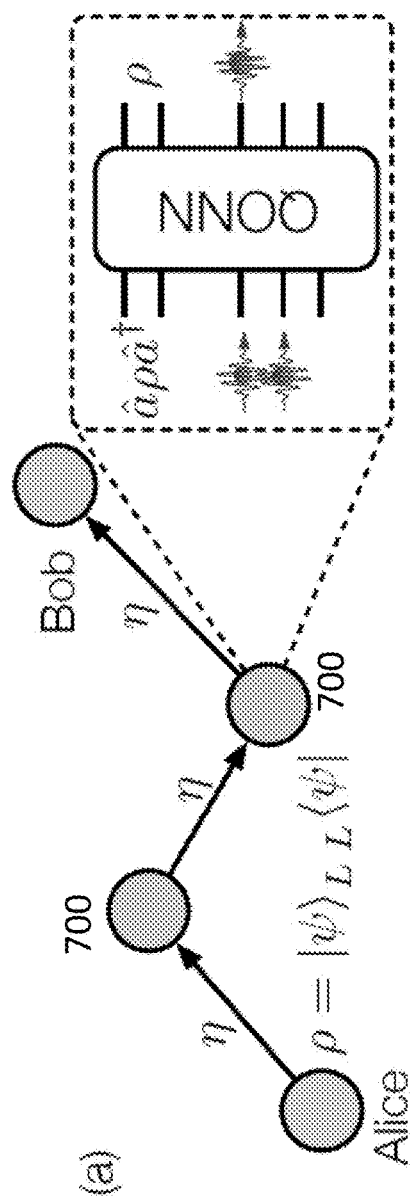
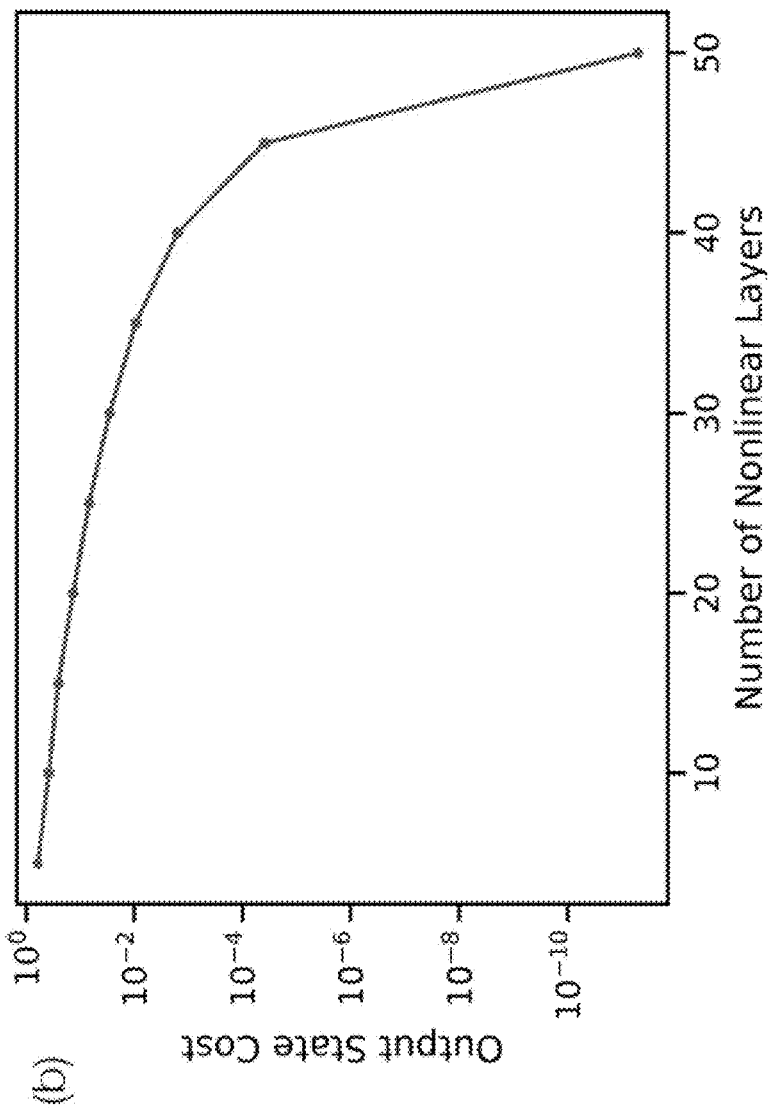
FIG. 7A
FIG. 7B

QUANTUM OPTICAL NEURAL NETWORKS

CROSS-REFERENCE TO RELATED APPLICATION(S)

This application claims the priority benefit, under 35 U.S.C. 119(e), of U.S. Application No. 62/851,784, filed on May 23, 2019, which is incorporated herein by reference in its entirety.

GOVERNMENT SUPPORT

This invention was made with government support under FA9550-14-1-0052 and FA9550-16-1-0391 awarded by the Air Force Office of Scientific Research. The government has certain rights in the invention.

BACKGROUND

Deep learning is revolutionizing computing for an ever-increasing range of applications, from natural language processing to particle physics to cancer diagnosis. These advances have been made possible by a combination of algorithmic design and dedicated hardware development. Quantum computing, while more nascent, is experiencing a similar trajectory, with a rapidly closing gap between current hardware and the scale required for practical implementation of quantum algorithms. Error rates on individual quantum bits (qubits) have steadily decreased, and the number and connectivity of qubits have increased, making so-called Noisy Intermediate Scale Quantum (NISQ) processors capable of tasks too hard for a classical computer a near-term prospect. Experimental progress has been met with algorithmic advances and near-term quantum algorithms have been developed to tackle problems in combinatorics, quantum chemistry and solid state physics. However, it is only recently that the potential for quantum processors to accelerate machine learning has been explored.

Quantum machine learning for universal quantum computers has been proposed and small-scale demonstrations implemented. Relaxing the requirement of universality, quantum machine learning for NISQ processors has emerged as a rapidly advancing field that may provide a plausible route towards practical quantum-enhanced machine learning systems. These protocols typically map features of machine-learning algorithms (such as hidden layers in a neural network) directly onto a shallow quantum circuits in a platform independent manner.

SUMMARY

Although the demonstration of an unambiguous quantum advantage in machine learning is an open question, an increasing number of results and heuristic arguments indicate quantum systems are well-suited to addressing such computational tasks. First, certain classes of non-universal quantum processors have been shown to sample from probability distributions that, under plausible complexity theoretic conjectures, cannot be sampled from classically. For example, ensembles of non-interacting photons (which is a subclass of the architecture presented here) sample from non-classical distributions even without the optical nonlinearities required for quantum universality. Speculatively, this may enable quantum networks, in certain instances, to surpass classical networks in both generative and recognition tasks.

Second, classical machine learning typically involves many linear algebraic operations. Existing quantum algorithms have already demonstrated theoretical speed increases in problems related to many of the most elementary algebraic operations such as Fourier transforms, vector inner products, matrix eigenvalues and eigenvectors, and linear system solving. These techniques may form parts of a toolkit enabling quantum machine learning. Finally, certain physical systems, such as those studied in quantum chemistry, are naturally encoded by quantum information. Quantum features of these states, such as coherence and entanglement, are naturally exploitable by networks that themselves are quantum. Classical computers, on the other hand, use an exponential (in, for instance, the number of spin orbitals of a molecule) amount of memory to even encode such states.

Here, we introduce an architecture which unites the complexity of quantum optical systems with the versatility of neural networks: the Quantum Optical Neural Network (QONN). Unlike protocols and architectures that map machine-learning algorithms onto shallow quantum circuits, the quantum optical neural networks presented here leverage features unique to photonics platforms. Mode mixing, optical nonlinearity, and other features of quantum optics can be mapped directly to neural networks. The resulting QONN can be trained to implement both coherent quantum operations and classical learning tasks; this suggests that it has much of the functionality of both its parent platforms. Moreover, technological advances driven by trends in photonic quantum computing and the microelectronics industry offer a plausible route towards large-scale, high-bandwidth QONNs, all within a CMOS compatible platform.

Numerical simulations and analysis illustrate a QONN's ability to perform several quantum information science protocols. We benchmark the QONN by designing quantum optical gates where circuit decompositions are already known. Next, we show that our system can learn to simulate other quantum systems using only a limited set of input/output state pairs, generalizing what it learns to previously unseen inputs. We demonstrate this learning on both Ising and Bose-Hubbard Hamiltonians. We then introduce and test a quantum optical autoencoder protocol for compression of quantum information, with applications in quantum communications and quantum networks. This again relies on the ability to train a QONN using a subset of possible inputs. Next, we apply a QONN to a classical machine learning controls task, balancing an inverted pendulum, by a reinforcement learning approach. Finally, we train the QONN to implement a one-way quantum repeater, whose physical implementation was, until now, unknown.

The results presented here show that a QONN may find application both as a technique for designing next generation quantum optical systems and as a versatile experimental platform for near-term optical quantum information processing and machine learning. Moreover, machine learning protocols for NISQ processors typically operate on quantum states for which there is no clear classical analogue. Similarly, a QONN may be able to perform inference on quantum optical states, such as those generated by molecular systems or states within a quantum network.

A QONN can be implemented with an array of single-photon sources, a plurality (e.g., at least five) of neural network layers in optical communication with the array of single-photon sources, and an array of single-photon detectors in optical communication with the plurality of neural network layers. The arrays of single-photon nonlinearities can include arrays of defect centers, quantum dots, or cavity-based nonlinearities. The QONN may also include an array of phase shifters, in optical communication with at least array of interconnected optical switches, to trim phases of the single photons.

In operation, the array of single-photon sources, which can include heralded spontaneous or deterministic single-photon sources, emits single photons. The neural network layers perform a neural network operation on the single photons. More specifically, alternating arrays of interconnected optical switches in the neural network layers perform respective linear operations on the single photons and arrays of single-photon nonlinearities in the neural network layers perform respective nonlinear operations on the single photons. And the array of single-photon detectors detects the single photons.

The respective linear operations can be respective arbitrary unitary operations. And the respective nonlinear operations can comprise a phase shift depending on a photon-number of photons incident on a single-photon nonlinearity in one array of single-photon nonlinearities. This phase shift can be π. It can also be π.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1 shows a classical neural network architecture, where hidden layers are rectified linear units (ReLU) and the output neuron uses a sigmoid activation function to map the output into the range (0, 1).

FIG. 2A shows a quantum optical neural network (QONN) architecture. Inputs are single photon Fock states. The single-photon nonlinearities are given by a Kerr-type interaction applying a phase quadratic in the number of photons. Readout is given by photon-number resolving detectors which measure the photon number at each output mode.

FIGS. 3A-3I are plots showing 50 training runs each for each of three representative optical quantum computing tasks (performing a CNOT gate, separating/generating Bell states, and generating GHZ states) for QONNs with 2-10 layers.

FIG. 3J is a plot of QONN success percentage versus the number of QONN layers for each of the three tasks performed in FIGS. 3A-3I.

FIG. 6A shows an architecture for a directly encoded reinforcement learning network.

FIG. 6B shows an architecture for a quantum random access memory (QRAM)-encoded reinforcement learning network.

FIG. 7A shows one-way quantum repeaters implemented with suitably trained QONNs (inset) used to correct photon loss on logically encoded qubits $|\psi\rangle_L$ sent through a lossy channel with transmissivity η.

FIG. 7B shows numerical simulation results of a (m, n)=(4,2) code, which corrects single photon loss. The output fidelity for a given number of layers is plotted, reaching numerical accuracy at 50 layers.

DETAILED DESCRIPTION

A quantum optical neural network (QONN) maps many of the auspicious features of classical neural networks onto the quantum domain. Through numerical simulation and analysis, a QONN can perform a broad range of quantum information processing tasks, including newly developed protocols, such as quantum optical state compression for quantum networking and black-box quantum simulation. A QONN can be implemented in a photonic integrated circuit with thanks to advances in integrated photonics and nano-fabrication, which have enabled monolithically integrated circuits with many thousands of optoelectronic components.

The QONN architecture presented here is not limited to the integration of systems with strong single-photon nonlinearities and can serve as an intermediate step towards large-scale photonic quantum technologies. In this intermediate regime, a QONN may learn practical quantum operations with weak or noisy nonlinearities which are otherwise unsuitable for fault-tolerant quantum computing.

A QONN combines the versatility of neural networks and the complexity of quantum optical systems. It can be used to discover implementations of a quantum gate that can be articulated analytically but may be difficult or impossible to simulate or build. An actual (built) system may have errors but could "learn" to operate in the presence of those errors. It may be possible to simulate those errors, but any simulation will almost certainly be imperfect or incomplete. Conversely, a QONN can provide or emulate error-free or error-mitigated operation of the quantum gate.

Classical Neural Network Architectures

Figure 1:
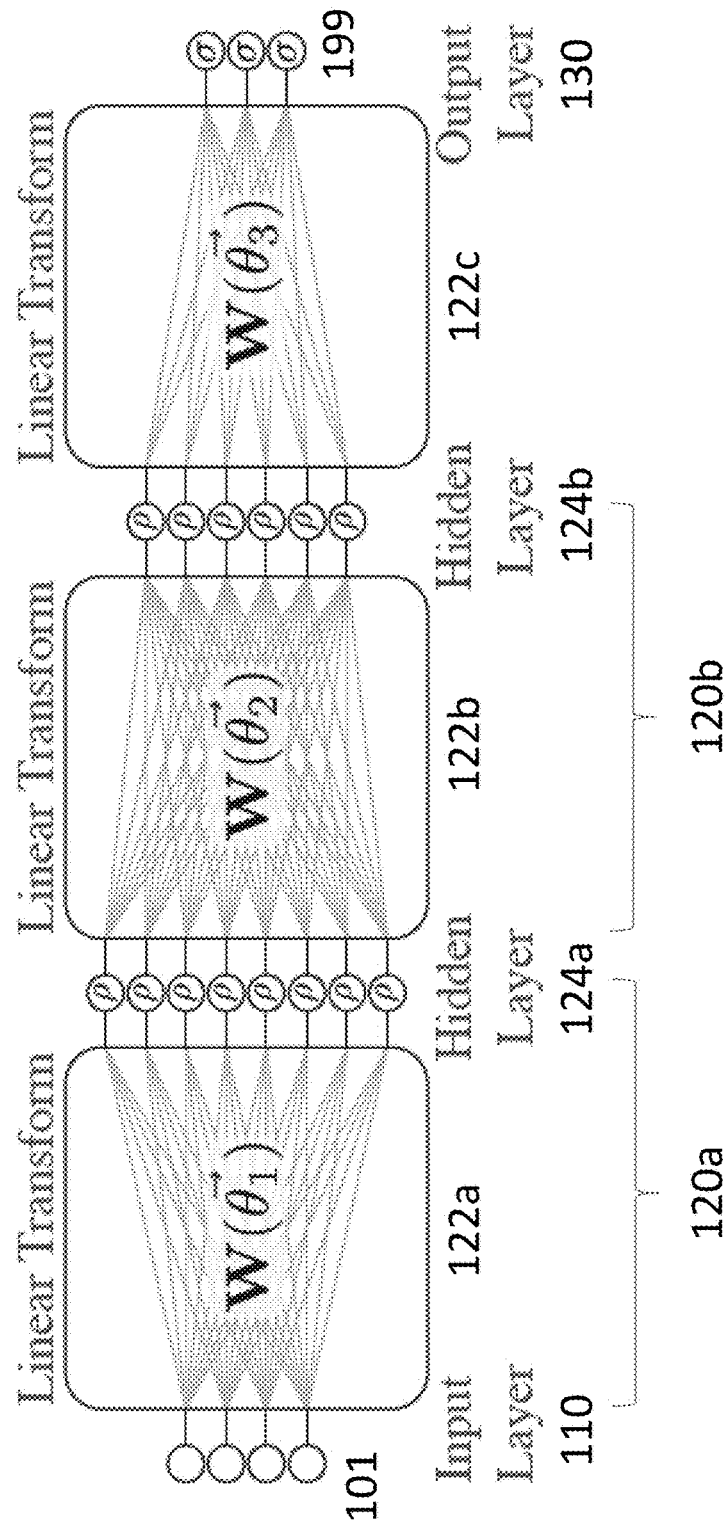

FIG. 1 shows a two-layer classical neural network 100. This classical neural network 100 includes an input layer 110, two hidden layers 120a and 120b, and an output layer 130. Each hidden layer 120a (120b) includes a set of weighted connections 122a (122b) that connects the inputs to a corresponding set of neurons or perceptrons 124a (124b). Similarly, the output layer 130 also includes a set of weighted connections 122c that maps inputs to outputs.

In the classical neural network 100 shown in FIG. 1, an input vector $\vec{x} \in \mathbb{R}^n$ passes through multiple layers of: (1) linear transformations by the weighted connections 122a-122c, i.e., matrix multiplications $W(\theta_i)$. $\vec{x}$ parameterized by weights $\theta_i$ at layer i, and (2) nonlinear operations $\sigma(\vec{x})$ by the neurons 124a and 124b. The nonlinear operations performed by the nodes in the hidden layers 130a and 130b are single-photon nonlinear functions sometimes parameterized by biases $\vec{b}_i$. These single-photon nonlinear functions are referred to as perceptrons or neurons, such as rectifying and sigmoid neurons.

The neural network 100 optimizes the parameter sets $\{\theta_i\}$ and $\{b_i\}$ to realize a particular input-output function $f(\vec{x})=y$. The power of the neural network 100 lies in the fact that when trained over a large data set $\{\vec{x}_i\}$, this often highly nonlinear functional relationship is generalizable to a large vector set to which the neural network 100 was not exposed during training. For example, in the context of cancer diagnosis, the input vectors may be grayscale values of pixels of an image of a cell, and the output may be a two-dimensional vector that corresponds to the binary label of the cell as either a benign or malignant. Once the neural network 100 is trained, it may categorize new, unlabeled, images of cells as either 'benign' or 'malignant' with high probability of being correct.

Quantum Optical Neural Network (QONN) Architectures

Figure 2A:
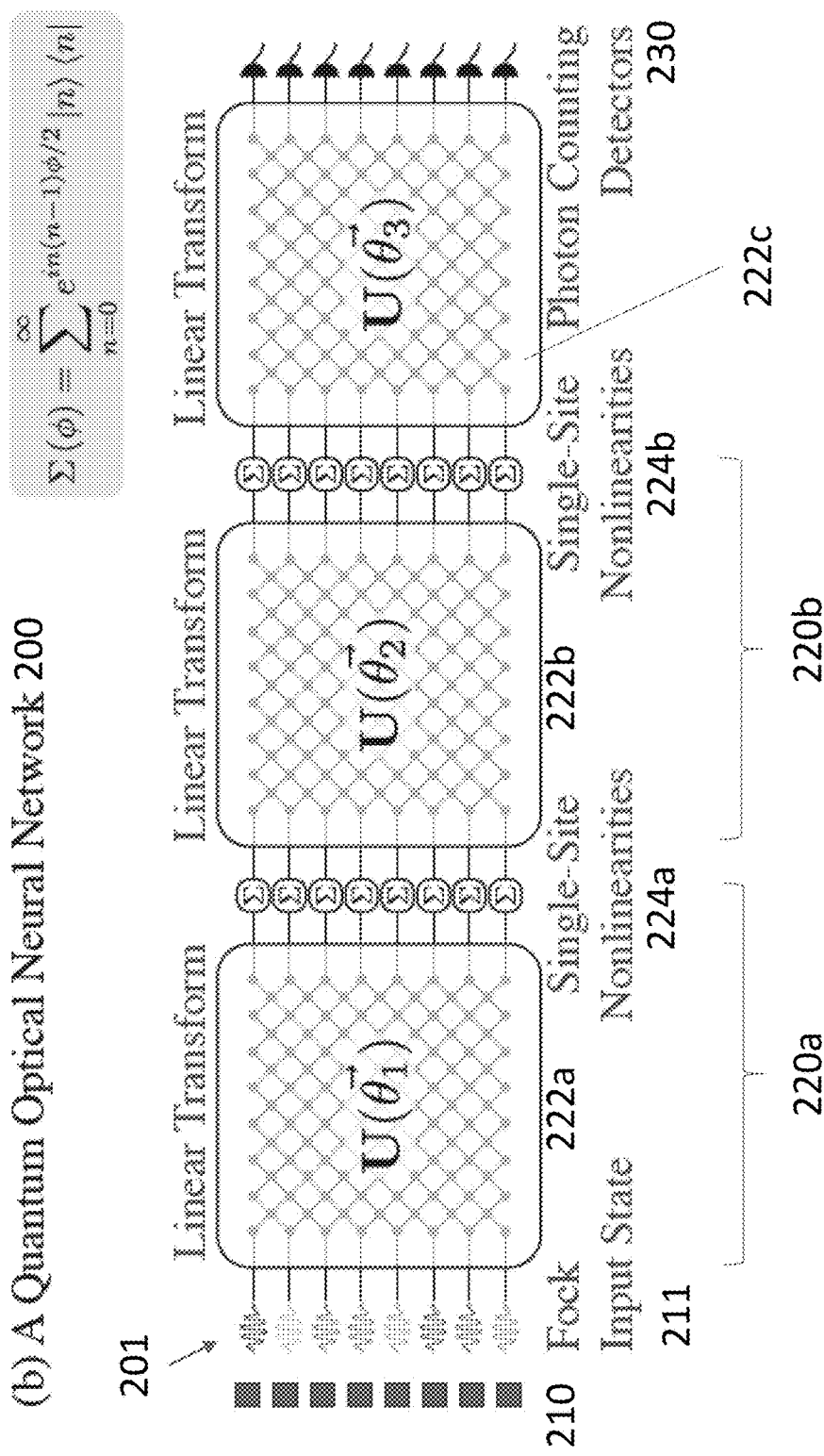
FIG. 2B shows side (left) and top (right) views of an optical mode converter suitable for use in the QONN of FIG. 2A.
FIG. 2C shows a probabilistic heralded single-photon source suitable for use in the QONN of FIG. 2A.
FIG. 2D shows a deterministic single-photon source suitable for use in the QONN of FIG. 2A.
FIG. 2E shows a linear optical circuit single-photon source suitable for use in the QONN of FIG. 2A.
FIG. 2F shows a single-photon nonlinearity single-photon source suitable for use in the QONN of FIG. 2A.

FIG. 2A shows a two-layer quantum optical neural network (QONN) 200. Like a classical neural network, the QONN 200 includes intermediate or hidden layers 220a and 220b arranged in succession between input and output layers. Unlike other optical neural networks, the QONN 200 the input includes an array of single-photon sources 210 that emit single photons 211. In addition, each hidden layer 220a (220b) includes a linear circuit in the form of an optical switching matrix 222a (222b) or other optical interconnect and an array of strong, single-photon nonlinearities 224a (224b). (Another optical switching matrix 222c couples the output of the last hidden layer 220b to the single-photon sources 210.)

The QONN 200 in FIG. 2A and many of its component are readily implementable in a photonic integrated circuit (PIC) using state-of-the-art integrated photonics techniques. First, single-photon sources 210 can be fabricated and integrated with a PIC substrate using techniques like those disclosed in U.S. application Ser. No. 16/734,727, entitled "Scalable Integration of Hybrid Optoelectronic and Quantum Optical Systems into Photonic Circuits," which is incorporated herein by reference in its entirety.

Second, the linear circuits (optical switching matrices) 222 for matrix multiplication can be realized across optical modes (where each mode contains a complex electric field component) via arrays of beam splitters and programmable phase shifters. In the lossless case, an n-mode optical circuit comprising n(n−1) components implements an arbitrary n×n single particle unitary operation (which can also be used for classical neural networks), and a n-dimensional non-unitary operation can be embedded across a 2n-mode optical circuit. Advances in integrated optics have enabled the implementation of such circuits for applications in quantum computation, quantum simulation, and classical optical neural networks.

Third, the single-photon nonlinearities 224 can be implemented using optical nonlinearities, which are in many classical and quantum optical computing architectures. Single-photon coherent nonlinearities 224 can be implemented via measurement, interaction with three-level atoms or superconducting materials, or through all-optical phenomena, such as the Kerr effect. Notably, promising progress has been made towards solid-state waveguide-based nonlinearities. (Alternatively, the single-photon nonlinearities can be replaced with either weak nonlinearities (e.g., those with phase shifts much less than $\pi$) or noisy nonlinearities that decohere the photons. The exact level of noise or strength of the nonlinearity depends on the application.)

Fourth, the single-photon detectors 230 can be implemented as superconducting nanowire single photon detectors (SNPSDs), which enable ultra-efficient single photon readout, via low-loss out-coupling to a dedicated high-efficiency detection system or through the direct integration of SNSPDs on chip. Moreover, advances in electronic readout have made it possible to scale SNSPDs across many channels and with photon number resolution. While incorporating these technologies into a single scalable system is an outstanding challenge, hybrid integration techniques like those in U.S. application Ser. No. 16/734,727 can be used to combine otherwise incompatible material platforms.

The QONN 200 may have a single stage of single-photon detectors 230, so photons can be out coupled via a low-loss mode convertor that expands the single photon optical mode size on chip, then a fiber array to collect photons across multiple channels. As shown in FIG. 2B, this optical mode converter 250 may include an adiabatically tapered silicon slab waveguide 252 between a buried oxide (BOX) layer 254 and a polymer upper cladding 256. The optical mode expands between the tip of the waveguide 252 and an optical fiber 258 that is next to the edge of the QONN chip. The fiber 258 can deliver the photons from the optical mode converter 250 to a commercial superconducting nanowire single photon detection (SNSPD) system. Alternatively, SNSPDs can be integrated on-chip via pick and place methods or through direct fabrication.

The QONN in FIG. 2A is a discrete variable QONN. The discrete variable QONN architecture in FIG. 2A can be mapped to other platforms that manipulate bosonic modes, such as ultracold atoms, superconducting cavities, or phononic modes in trapped ions. In each of these platforms, reconfigurable linear mode transformations complement ultra-strong nonlinearities, thus making bosonic quantum simulators suitable for QONNs.

Continuous variable implementations of QONNs are also possible. In a QONN that operates on continuous variables instead of discrete variables, the sources produce squeezed states of light. One way to produce a squeezed state is with a nonlinear optical material and a cavity, such as a microring resonator in silicon nitride or periodically polled lithium niobate. Similarly, the linear circuitry performs further squeezing operations and displacement operations that aren't used with discrete variables. And the detectors for a continuous-variable QONN should be photon-number resolved detectors, whereas a discrete-variable QONN can operate with "bucket" detectors that can resolve less than one photon from at least one photon.

Probabilistic and Deterministic Single-Photon Sources

The single-photon sources 210 can be realized as probabilistic spontaneous sources or deterministic sources based on two-level emitters. The QONN architecture can be the same for both probabilistic spontaneous sources and deterministic sources. A spontaneous source produces two photons probabilistically, at different wavelengths, so a QONN architecture with spontaneous sources may include an extra detector per source to signal that the other photon of the pair has been generated.

Suitable probabilistic spontaneous sources may use four-wave (4WM) mixing in $\chi^{(3)}$ materials (e.g., silicon, silicon nitride, and silica) or spontaneous parametric down-conversion in $\chi^{(2)}$ materials (e.g., lithium niobate, gallium arsenide, and aluminum nitride) to produce pairs of single photons. For both $\chi^{(2)}$ and $\chi^{(3)}$ single-photon sources, the interaction lengths can be increased by placing the $\chi^{(2)}$ and $\chi^{(3)}$ material in resonant cavities or by fashioning them into (micro-ring) resonators, which also causes a resonant enhancement effect that can greatly increase the pair generation rate. For pairs of photons generated at different frequencies (so-called nondegenerate processes), one photon can be used as a trigger to herald the generation of the other.

Figure 2C:
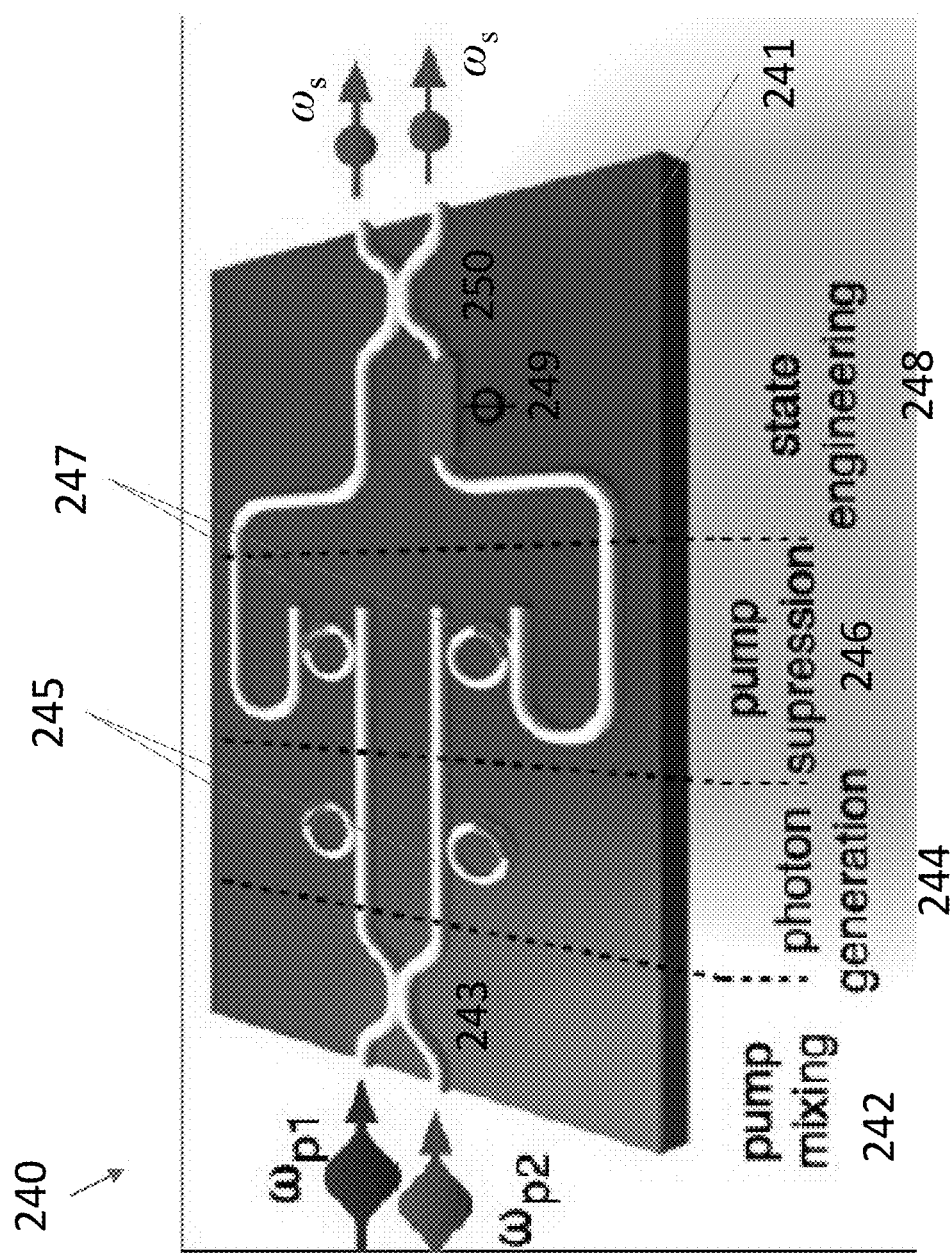

FIG. 2C shows a probabilistic single-photon source 240 suitable for use in the QONN 200 of FIG. 2A. This source 240 emits a pair of photons at the same frequency. This pair of photons can be 'split' via the inverse Hong-Ou-Mandel effect using a Mach-Zehnder interferometer. The source 240 is integrated in a substrate 241 includes an input mixing stage 242 with a beam splitter 243 that receives and mixes pump photons at frequencies of $\omega_1$ and $\omega_2$. The mixed pump photons propagate to a photon generation stage, where the pump photons are evanescently coupled to a pair of micro-ring resonators 245 with nonlinear material (e.g., $\chi^{(2)}$ or $\chi^{(3)}$ material), which emits pairs of degenerate signal photons at a frequency $\omega_s$. Micro-ring resonator filters 247 in a pump suppression stage 246 transmit the pairs of signal photons without transmitting the pump photons. The pairs of signal photons can be place in an engineered state with a programmable phase shifter 249 and beam splitter 250.

Deterministic single-photon sources may be realized by two-level emitters, such as quantum dots which can emit at telecommunications wavelengths (InAs/InP) or visible (GaAs, SiV, NV, GeV) wavelengths. These quantum dots can be integrated into waveguide systems which contain the reconfigurable mode transformations via heterogeneous integration techniques. For example, individual waveguides or arrays of waveguides loaded with quantum dots can be fabricated in a material that is then 'pick and placed' onto a reconfigurable photonic backbone.

Figure 2D:
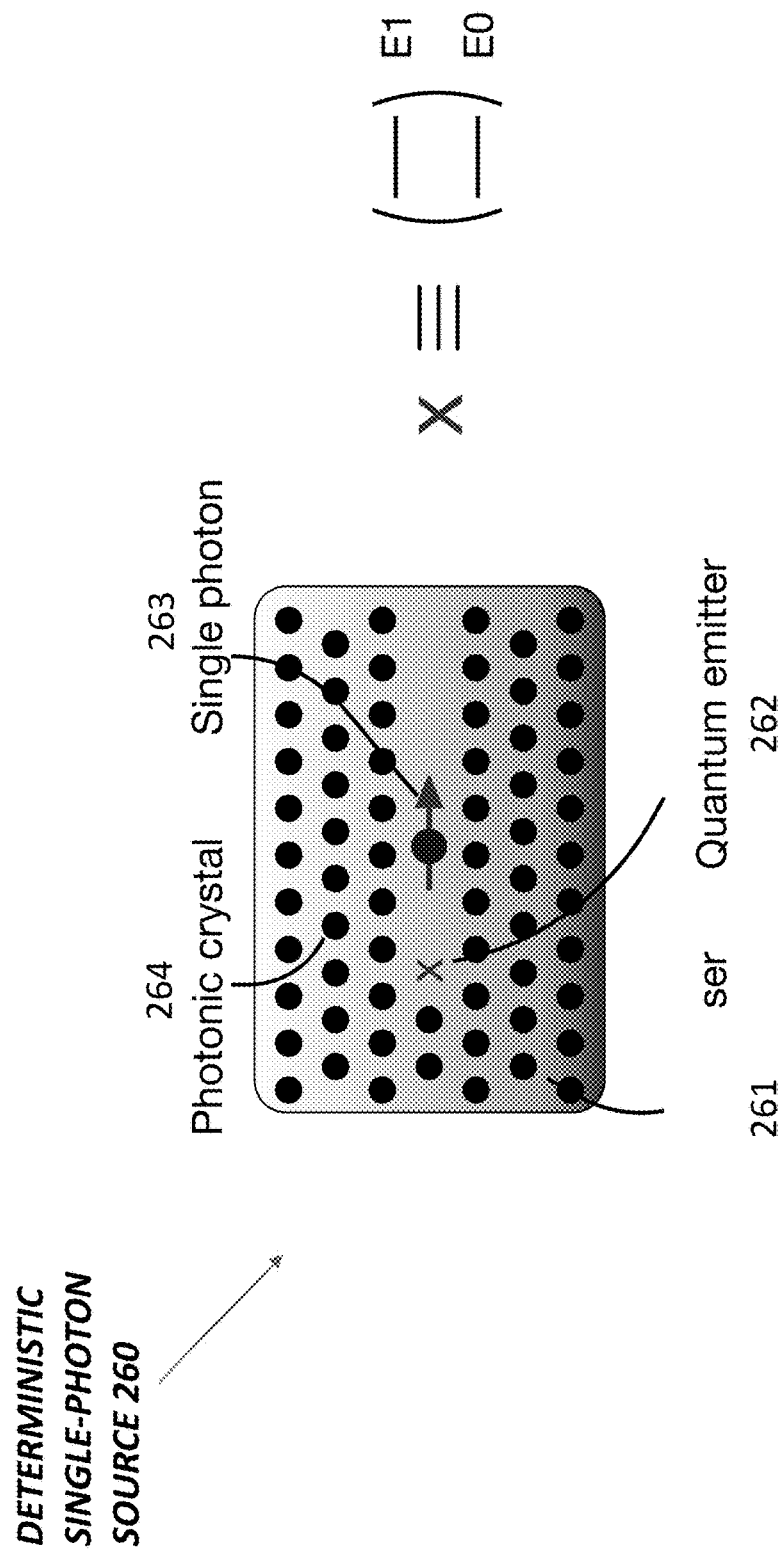

FIG. 2D shows a deterministic single-photon source 260 with a quantum emitter 262 in a photonic crystal cavity 264. Pump light 261 from an excitation laser (not shown) excites the quantum emitter 262 from a ground state E0 to an excited state E1, shown at right. The quantum emitter 262 emits a single photon 263 as it relaxes from the excited state E1 to the ground state E0. The quantum emitter 262 and photonic crystal cavity 264 can be formed or integrated into the same substrates as the linear circuits 222 or implemented separately.

Linear Circuits (Optical Switching Matrices)

FIG. 2E shows the QONN's linear circuit (optical switching matrix) 222 in greater detail. It includes a set of reprogrammable, interconnected beam splitters—shown in here as Mach-Zehnder interferometers 282—fabricated in a substrate 281. (This may be implemented as the same substrate that supports the single-photon sources and nonlinearities.) The splitting ratios of the Mach-Zehnder interferometers 282 can be adjusted electrically (e.g., by applying appropriate bias voltages) to provide the desired coupling weights between the inputs and outputs of the linear circuit 222. Phase shifters 281 at the outputs (or, equivalently, the inputs) of the linear circuit 222 trim the phases of the photons exiting the linear circuit 222 to account for undesired optical path length mismatch due to, e.g., fabrication imperfections.

Single-Photon Nonlinearities

Each strong single-photon nonlinearity in the QNN imparts a phase shift that depends nonlinearly on the photon number, e.g., $|n\rangle \rightarrow e^{i n(n-1)\phi}|n\rangle$, at the low photon number limit, e.g., O(10) photons. Put differently, the phase shift imparted by a single-photon nonlinearity depends on the number of incident photons, which may be about 1-10. These strong single-photon nonlinearities can be implemented using a number of different technologies, including measurement-induced phase shifts, atom-mediated phase shifts, nonlinear cavities, and superconducting cavities.

A measurement-induced phase shift can be implemented by quantum interference. When a "computational" photon emitted by a single-photon source 210 reaches a single-photon nonlinearity 224, it interferes with an ancillary photon via the Hong-Ou Mandel effect. By registering a detection event in the ancillary output modes, a nonlinearity can be heralded with some probability (e.g., p=0.25). The interfering computation and ancillary photons should have a strong modal overlap, which can be enhanced via filtering.

A three-level atomic system can be used to mediate strong photon-photon Kerr interaction. Also, a two-level emitter (e.g., an atom) in a photonic crystal cavity in the weak coupling regime can be used to realize a Fock state filter. By detuning the atom, the strength of the nonlinearity can be varied. The variational architecture can be used to 'learn' operations given this nonlinearity.

Injecting the photons into an ultra-high quality factor (e.g., $Q>10^6$), low-mode-volume (e.g., $<1/\lambda^3$), dynamically coupled cavity (e.g., a photonic crystal cavity in lithium niobate) can enable a high-fidelity single-photon nonlinearity. Dynamic cavity coupling can be implemented via optical or microwave fields in an electro-optic material. Alternatively, interactions between microwave photons stored in an optical cavity can be mediated via a superconducting transmon qubit to realize a Kerr-type nonlinear interaction.

Figure 2F:
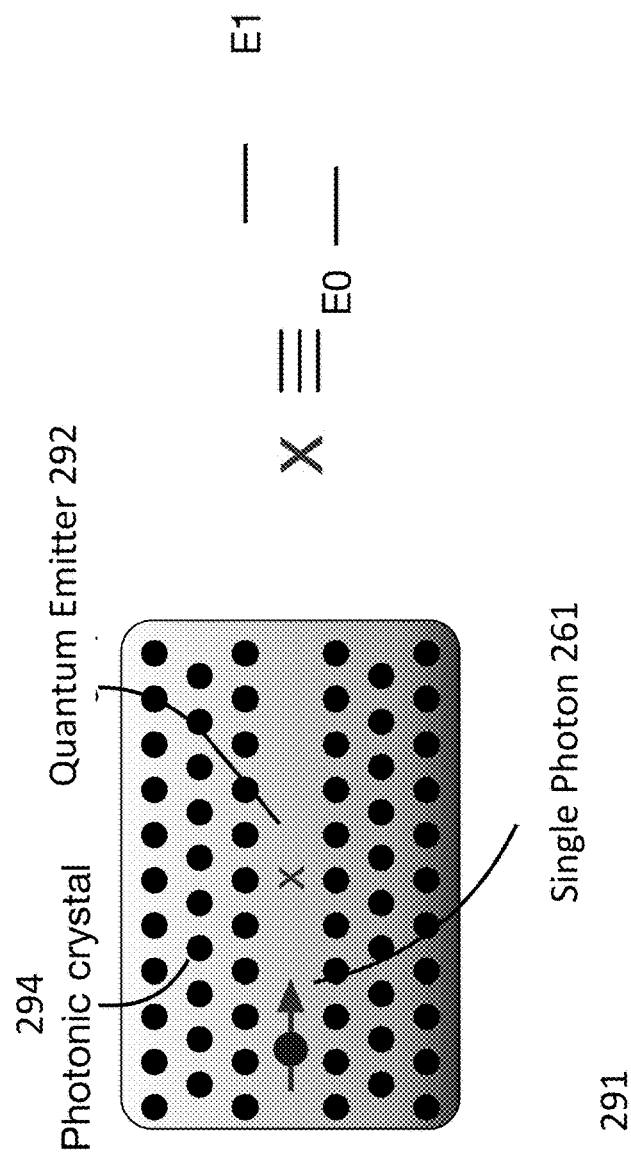

FIG. 2F shows a single-photon nonlinearity 224 comprising a three-level quantum emitter 292 in a photonic crystal cavity 294 with a quality factor of at least $10^6$ and a mode volume of less than $1/\lambda^3$, where $\lambda$ is the single photon wavelength. A control field 291 generated by a laser (not shown) mediates a photon-photon Kerr interaction between a single photon 261 and the quantum emitter 292. Depending on the state of the control field 291, the single photon 261 either accumulates a phase delay (e.g., of about $\pi$).

QONN Training and Operation

Input data to the QONN 200 in FIG. 2A can be encoded as photonic Fock states $|i\rangle_j$ (corresponding to i photons in the $j^{th}$ optical mode), which for n photons in m modes is described by a $$\binom{n+m-1}{m}$$

dimensional complex vector of unit magnitude. As shown below, leveraging the full Fock space may be advantageous for training certain classes of QONN. The linear circuit is described by an m-mode linear optical unitary $U(\vec{\theta})$ parameterized by a vector $\vec{\theta}$ of $m(m-1)$ phases shifts $\theta_i \in (0, 2\pi]$. The nonlinear layer $\Sigma$ comprises single mode Kerr interactions in the monochromatic approximation, applying a phase that is quadratic in the number of photons present. For a given interaction strength $\phi$, this unitary can be expressed as $\Sigma(\theta) = \Sigma_{n=0}^{\infty} \exp[in(n-1)\phi/2]|n\rangle\langle n|$. The full system comprising N layers is therefore $$S(\vec{\Theta}) = \Pi_i^N \Sigma(\phi) \cdot U(\vec{\theta}_i), \quad (1)$$

where $\vec{\Theta}$ is a $Nm(m-1)$-dimensional vector and the strength of the nonlinearity is typically fixed as $\phi = \pi$.

Finally, photon-number resolving detectors measure the photon number at each output. We consider number-resolution without loss of generality as so-called threshold detectors (vacuum, or not) can be made non-deterministically number-resolving via beam splitters and multiple detectors. We use the results of this measurement, along with a training set of K desired input/output pairs $\{|\psi_{in}^i\rangle \rightarrow |\psi_{out}^i\rangle\}_{i=1}^K$, to construct a cost function $$C(\vec{\Theta}) = 1 - \frac{1}{K}\sum_{i=1}^{K}\left|\langle\psi_{out}^i|S(\vec{\Theta})|\psi_{in}^i\rangle\right|^2$$

that is variationally minimized over $\vec{\Theta}$ to find a target transformation (up to an unobservable global phase). The QONN architecture is also capable of implementing classical optical neural networks and may therefore benefit from advances in this rapidly growing field.

There are at least two approaches to training a QONN: in situ and in silico. The in situ approach directly optimizes the quantum optical processor and measurements are made via single photon detectors at the end of the circuit. One aim is to optimize figures of merit that can be estimated with a number of measurements that scales polynomially with the photon number (as opposed to full quantum process tomography). If the target state is accessible, the overlap can be estimated with the addition of a controlled-SWAP operation, which is related to the Hong-Ou-Mandel effect in quantum optics. Efficient fidelity proxies provide another route towards estimating salient features of quantum states without reconstruction of the full density matrix. Moreover, the in situ approach may enable a form of error mitigation by routing quantum information around faulty hardware. In contrast, the in silico approach simulates the QONN on a digital classical computer and keeps track of the full quantum state internal to the system. Simulations may be limited in scale, but may help guide the design of, say, quantum gates where the optimal decomposition is not already known, or as an ansatz for the in situ approach.

Benchmarking QONN Performance

A QONN can be validated by learning elementary quantum tasks, such as quantum state preparation, measurement, and quantum gates. We chose Bell state projection/generation, GHZ state generation, and the implementation of the CNOT gate to benchmark the QONN architecture in FIG. 2A. The training set for the Bell-state projector is the full set of Bell states $\{|\psi_{in}^i\rangle\} = \{|\Phi^+\rangle, |\Phi^-\rangle, |\Psi^+\rangle, |\Psi^-\rangle\}$ encoded as dual rail qubits. The goal was to map these to a set of states distinguishable by single-photon detectors, so the binary encoding was $\{|\psi_{out}^i\rangle\} = \{|1010\rangle, |1001\rangle, |0110\rangle, |0101\rangle\}$. A system designed to perform this map can then be run in reverse to generate Bell states from input Fock states. The CNOT gate uses a full input-output basis set with $\{|\psi_{in}^i\rangle\} = \{|1010\rangle, |1001\rangle, |0110\rangle, |0101\rangle\}$ and $\{|\psi_{out}^i\rangle\} = \{|1010\rangle, |1001\rangle, |0101\rangle, |0110\rangle\}$. The GHZ generator has a single input-output configuration $\{|\psi_{in}^i\rangle\} = \{|101010\rangle\}$ and $\{|\psi_{out}^i\rangle\} = \{(|101010\rangle + |010101\rangle)/\sqrt{2}\}$. For each of these cases, the training set represents the full basis set for the quantum operation of interest, and successful training illustrates the expressivity of the QONN architecture.

FIGS. 3A-3I show 50 training runs for QONNs of increasing layer depth from $N=2 \rightarrow 10$ with $\phi = \pi$ for each of three representative optical quantum computing tasks: performing a CNOT gate, separating/generating Bell states, and generating GHZ states. Evaluation number is the number of updates of $\vec{\Theta}$. At low layer depth, the optimizations frequently fail to converge to an optimal value (here, an error less than $10^{-4}$ is a "success"), terminating at relatively large errors. This behavior gets worse for more layers, out to five layers, at which point it undergoes a rapid reversal, with the training essentially always succeeding at layer depths of seven or more.

FIG. 3J shows the success percentage versus the number of layers for each of the three tasks. The non-monotonic behavior is due to the large variance in final costs at low layer number. Just like a classical neural network, as the layer depth increases, it becomes more consistently easy to find a local minimum that is close to the global minimum. This demonstrates the utility of deep networks: while a single layer may be sufficient to implement, e.g., a CNOT gate, a deep network can reliably discover a configuration that yields the correct operation. For more complex operations, where the small-layer-number implementation may be difficult to find or may not exist, this gives hope that we can still reliably train a deep network to perform the task. While the inputs and desired outputs are restricted to the dual-rail basis, at intermediate layers, the joint state of the photons spans the entire Fock space, which is a unique feature of photonic systems.

Hamiltonian Simulation

Like other learning systems, a QONN can generalize to states on which it has not been trained. To assess generalization, we apply the QONN to the task of quantum simulation, where a well-controlled system in the laboratory $S(\vec{\Theta})$ is programmed over parameters $\vec{\Theta}$ to mimic the evolution of a quantum system of interest described by the Hamiltonian $\hat{H}$. In particular, we train a QONN on K sets of input/output states $\{|\psi_{in}^i\rangle\}$ $\{|\psi_{out}^i\rangle\}$ related by the Hamiltonian of interest $|\psi_{out}^i\rangle=\exp(-i\hat{H}t)|\psi_{in}^i\rangle$, and test it on new states which it has not been exposed to.

Figures 4A, 4B:
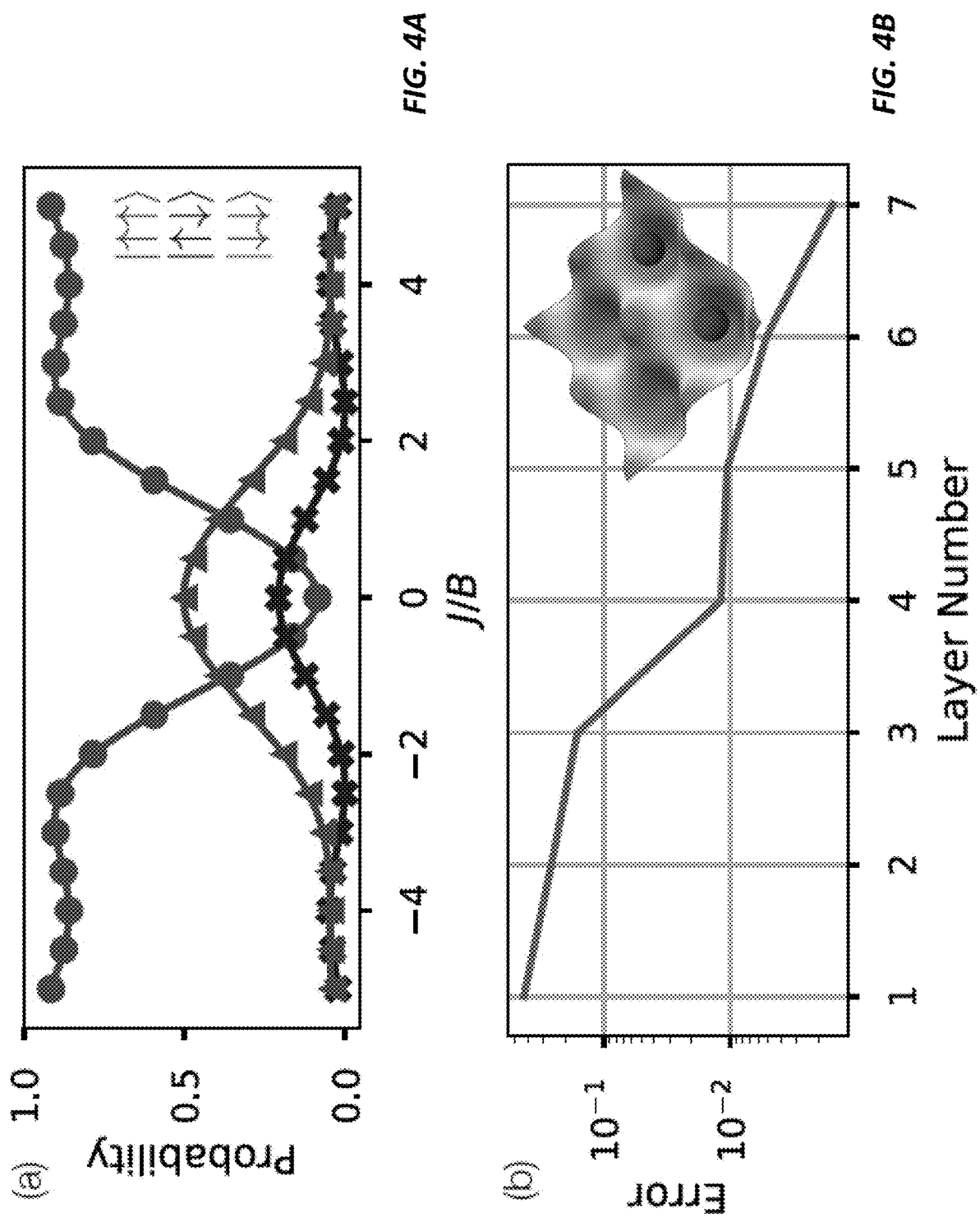
FIG. 4A is a plot of probability for particular output spin configuration versus interaction strength $J/B \in [-5,5]$ given the $|\uparrow\uparrow\rangle$ initialization state for a three-layer QONN trained to execute an Ising Model.
FIG. 4B is a plot of the number of layers in a QONN required to reach a particular test error for the simulation of a (2,4) strongly interacting $U/t_{hop}=20$ Bose-Hubbard Hamiltonian (schematic shown in inset) with t=1.

FIG. 4A illustrates performance of a three-layer QONN trained to simulate the Hamiltonian of the Ising model. The simulated Ising model is described by the Hamiltonian $$H_{ising} = B\sum_i \hat{X}_i + J\sum_{\langle i,j\rangle} \hat{Z}_i \otimes \hat{Z}_j,$$

where B represents the interaction of each spin with a magnetic field in the x direction, and J is the interaction strength between spins in an orthogonal direction. The Ising model is optically implemented via a dual-rail encoding with m=2n, where $|\uparrow\rangle\equiv|10\rangle_{12}$ and $|\downarrow\rangle\equiv|01\rangle_{12}$. For the n=2 spin case, the QONN is trained on a training set of 20 random two-photon states and tested on 50 different states.

More specifically, FIG. 4A shows the probability for particular output spin configurations (points) given the $|\uparrow\uparrow\rangle$ input state over a range of interaction strengths J/B∈[−5,5]. The lines indicate the expected evolution. This input state is not in set of states for which the QONN was trained. The results show that a three-layer QONN reliably converges to an optimum for a wide range of interaction strengths J/B values (with t=1).

A QONN trained for the n=3 spin case reaches an average test error of 10.1%. This higher error in the larger system motivates advanced training methods, such as backpropagation or layer-wise training approaches, to train deeper QONNs more efficiently.

FIG. 4B illustrates performance of a QONN simulating a Hamiltonian more natural for photons in optical modes, the Bose-Hubbard model. The simulated Bose-Hubbard model is described by the Hamiltonian $$\hat{H}_{BH} = \omega\sum_i \hat{b}_i^\dagger \hat{b}_i - t_{hop}\sum_{\langle i,j\rangle}\hat{b}_i^\dagger \hat{b}_j + U/2\sum_i \hat{n}_i(\hat{n}_i - 1),$$

where $\hat{b}_i^\dagger$ ($\hat{b}_i$) represents the creation (annihilation) operator in mode i, $\hat{n}_i$ the number operator and $\omega$, $t_{hop}$ and U the on-site potential, the hopping amplitude and the on-site interaction strength respectively. The (n, m) configuration of bosons to be simulated is naturally mapped to an n-photon, m-mode photonic system. The plot is of the number of QONN layers required to reach a particular test error for the simulation of a (2,4) strongly interacting $U/t_{hop}$=20 Bose-Hubbard Hamiltonian (schematic shown in inset) on a square lattice with t=1. Training is performed 20 times for each layer depth, and the lowest test error is recorded. The single-layer system gives a mean error in the test set of 42%, and seven layers yields an error of 0.1%.

FIG. 4B shows that increasing the number of layers in the QONN reduces the error on the test set, suggesting that deeper networks can express a richer class of quantum functions (e.g., Hamiltonians). This trend is familiar from classical deep neural networks. Choosing five layers to give a reasonable trade-off between error (~1%) and computational tractability, we vary the interaction strength in the range $U/t_{hop}$∈[−20,20]. Across all numerical simulations, the mean test error is 2.9±1.3% (error given by the standard deviation in 22 simulations).

While the analyses in FIGS. 4A and 4B focuses on Hamiltonians that exist in nature, the approach itself is very general: mimicking input-output configurations given access to a reduced set of input-output pairs from some family of quantum states. This property can be used in learning representations of quantum systems where circuit decompositions are unknown or in finding compiled implementations of known circuits.

QONN-Based Quantum Optical Autoencoders

Photons are used in quantum communication and quantum networking protocols as information carriers or to mediate interactions between long-lived atomic memories. However, such schemes are exponentially sensitive to loss: given a channel transmissivity η and number of photons n to encode a message, the probability of successful transmission scales as $\eta^n$. Reducing the photon number while maintaining the information content exponentially increases the communication rate. Fortunately, a QONN can be used as a quantum autoencoder to learn a compressed representation of quantum states to reduce the photon number and increase the communication rate. This compressed representation could be used, for example, to more efficiently and reliably exchange information between physically separated quantum nodes.

Quantum autoencoders have been proposed as a general technique for encoding, or compressing, a family of states on n qubits to a lower-dimensional k-qubit manifold called the latent space. Similar to classical autoencoders, a quantum autoencoder learns to generalize from a small training set T and can compress states from a family that it has not seen before. As well as applications in quantum communication and quantum memory, a quantum autoencoder has recently been proposed as a subroutine to augment variational algorithms in finding more efficient device-specific ansatzes. In contrast, a quantum optical autoencoder encodes input states in the Fock basis. Moreover, even if optical input states are encoded in the dual-rail qubit basis, the autoencoder may learn a compression onto a non-computational Fock basis latent space.

As a choice of a family of states, and one which is relevant to quantum chemistry on NISQ processors, consider the set of ground states of molecular hydrogen, $H_2$, in the STO-3G minimal basis set, mapped from their fermionic representation into qubits via the Jordan-Wigner transformation. Ground states in this qubit basis have the form $|\psi(i)\rangle\equiv\alpha(i)|0011\rangle_L+\beta(i)|1100\rangle_L$, where i is the bond length of the ground state. The qubits themselves are represented in a dual-rail encoding thus the network consists of n=4 photons in m=8 optical modes. The set of states $\{|\psi(i)\rangle\}$ are no longer related by a single unitary transformation as above.

The goal of the quantum optical autoencoder S, is for all states in the training set $|\psi(i)\rangle\in K$, satisfy $$S|\psi(i)\rangle=|000\rangle_L|\psi_i^C\rangle_L$$

for some two-mode state $|\psi_i^C\rangle$ in the latent space. The quantum autoencoder can therefore be seen as an algorithm that systematically disentangles n−k qubits from the set of input states and sets them to a fixed reference state (e.g., $|0\rangle_L^{\otimes n-k}$). For this reason, the fidelity of the reference state is used a proxy for the fidelity of the decoded state.

Figure 5A:
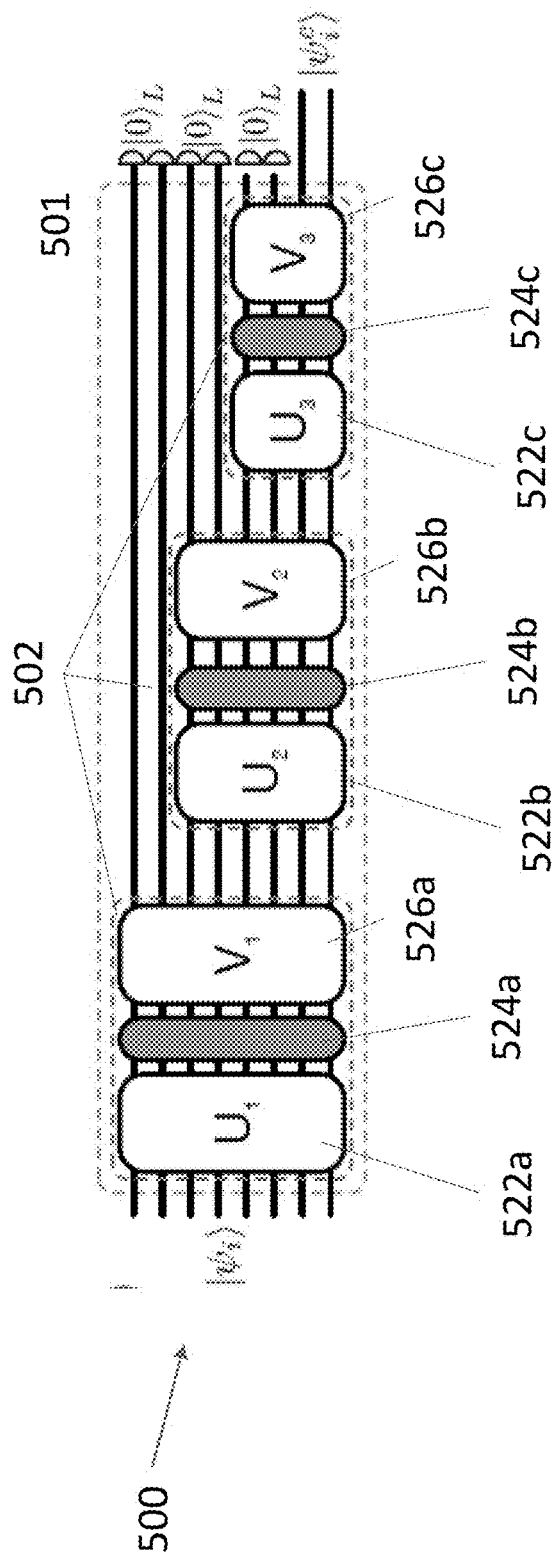
FIG. 5A shows QONN architectures of quantum optical autoencoders trained using global- and local-structured training strategies.
Figure 5B:
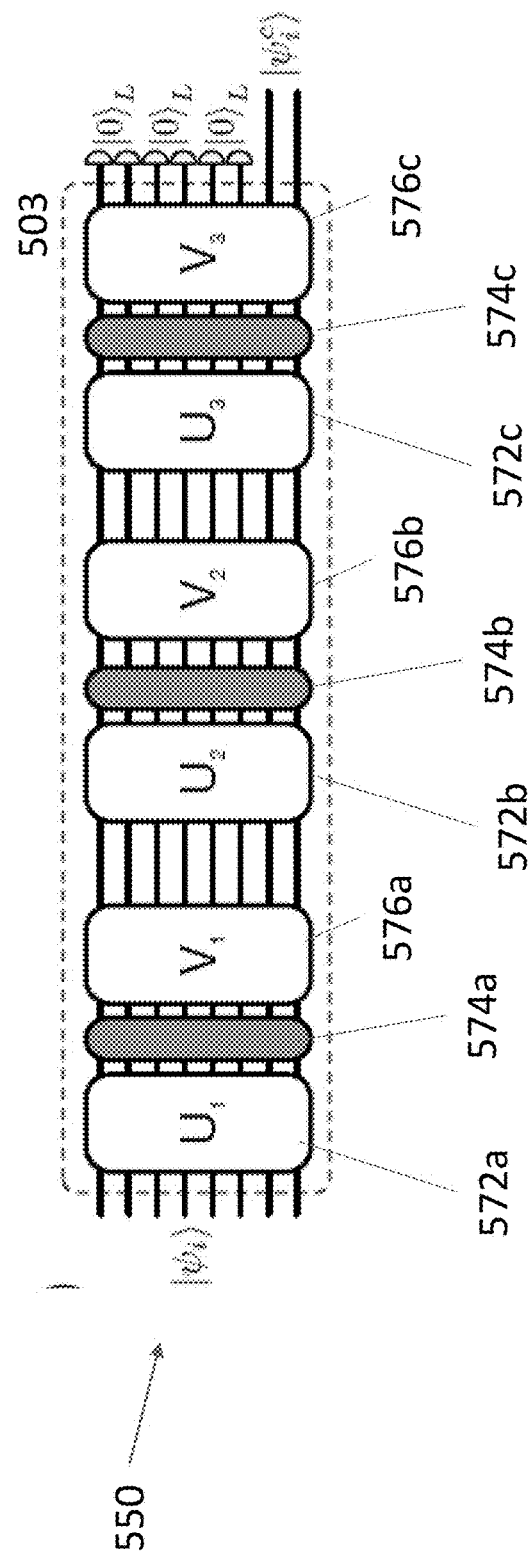
FIG. 5B shows the QONN architecture of a quantum optical autoencoder trained using a global-unstructured training strategy.
Figure 5C:
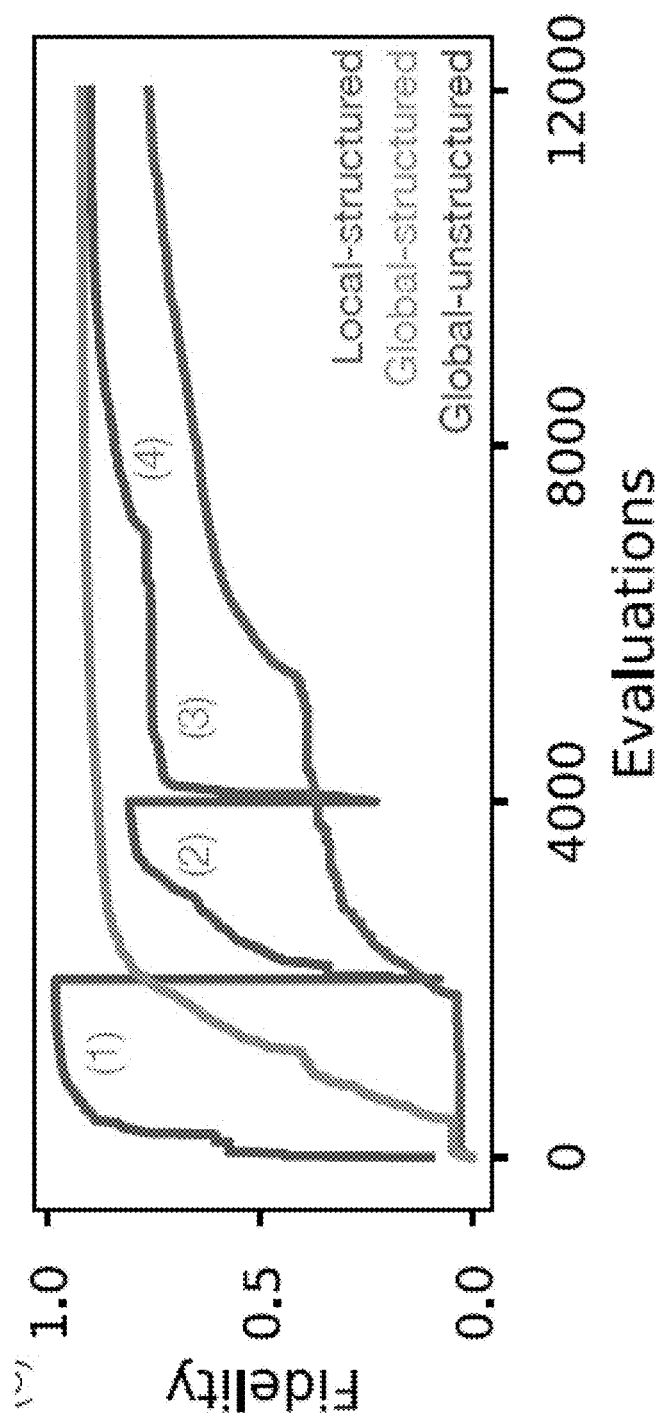
FIG. 5C is a plot of the fidelities of the reference states achieved by the local structured, global structured, and global unstructured training strategies used by a QONN-based quantum optical autoencoder to compress ground states of molecular hydrogen.

FIGS. 5A-5C illustrate training and performance of QONNs as quantum autoencoders. To train a quantum autoencoder, the circuit architecture should have general enough operations to compress the input states, but few enough parameters to train the network efficiently. In this case, the QONN is trained using three different training schemes.

FIG. 5A shows a QONN architecture 500 for the first two training schemes. This QONN includes a first, full-dimensional stage with linear circuits 522a and 526a that switch photons into and out of, respectively, a nonlinear layer 524a. Together, the linear circuits 522a and 526a and nonlinear layer 524a make up one neural network layer in the QONN. The next stage includes a linear circuit 522b in series with a nonlinear layer 524b and a linear circuit 526b that operate a lower-dimensional qubit space. And the final stage includes a linear circuit 522c in series with another nonlinear layer 524c and linear circuit 526b that operate an even lower-dimensional qubit space.

The first training scheme is local-structured training 501, shown in FIG. 5A, which involves sequentially optimizing two-layer QONNs to disentangle a single qubit at each stage, where each subsequent stage acts only on a reduced qubit subspace. This approach is followed by a final global refinement step after the layers have been individually trained. The second training scheme is global-structured training 502, also shown in FIG. 5A, where the layer structure is trained simultaneously rather than sequentially.

FIG. 5B shows a QONN architecture 550 for a third training scheme 503: global-unstructured training, where a six-layer system acting on four qubits is trained. This QONN architecture 550 includes a series of interleaved input linear circuits 572a-572c, nonlinear layers 574a-574c, and output linear circuits 576a-576c. Like the architecture of the global-structured training 502, the architecture for the global-unstructured training 503 remained the same throughout the entire optimization. In contrast, the local-structured (iterative) training 501 optimized the parameters of (1) the first linear circuits 522a ($U_1$) and 526a ($V_1$) first, before moving on to (2) the second linear circuits 522b ($U_2$) and 526b ($V_2$), and in the third phase (3) the third linear circuits 522c ($U_3$) and 526c ($V_3$), where the phases are indicated on FIG. 5C. The fourth phase (4) of the iterative training 501 involves all parameters in the optimization, similar to the global strategies 502 and 503.

FIG. 5C is a plot of the fidelities of the reference states achieved by the different training strategies to compress ground states of molecular hydrogen. While the global structured training 502 and global unstructured training 503 included all three reference qubits from the start, the large drops in fidelity for the iterative procedure (local unstructured training 501) are due to including increasingly more reference states in the optimization. The local (iterative) structured method 501 and global structured method 502 converged to fidelities of 92.2% and 90.0%, respectively, and global unstructured training 503 achieved a fidelity of 76.2%.

The optimization was performed using an implementation of MLSL (also available in the NLopt library), which is a global optimization process that explores the cost function landscape with a sequence of local optimizations (in this case BOBYQA) from carefully chosen starting points, using a heuristic to avoid local optima that have already been found. The training states were the set of four ground-states of $H_2$ corresponding to bond lengths of 0.5, 1.0, 1.5, and 2.0 angstroms. Both the global structured and iterative optimizations performed comparably. However, the iterative approach could be made more efficient with more stringent convergence criteria and may have better scaling or accuracy than global optimization in an asymptotic setting.

Quantum Reinforcement Learning

To demonstrate the utility of QONNs for classical machine learning tasks, and to show that they continue to generalize in that setting, we examine a standard reinforcement learning problem: trying to balance an inverted pendulum. Classical deep reinforcement learning uses a policy network, i.e., a network that takes an observation vector as input and outputs a probability distribution over the space of allowed actions. This probability vector is then sampled to choose an action, a new observation is taken, and the process repeats. As the output from a QONN is a probability distribution, policy networks are a natural application of QONNs.

Figure 6C:
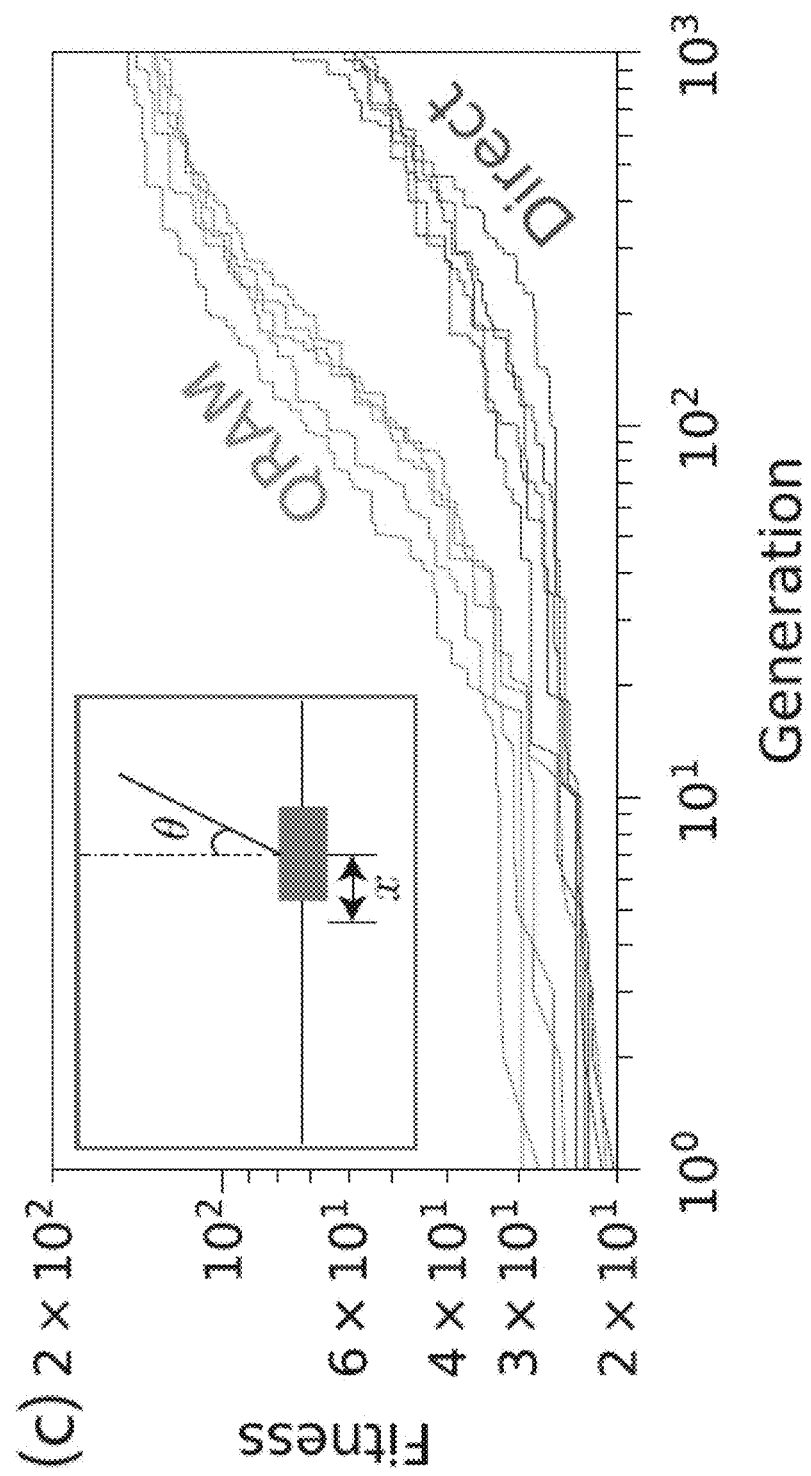
FIG. 6C is a plot of fitness vs. training generation for five different training runs of directly encoded reinforcement learning and QRAM-encoded reinforcement learning with QONNs. The inset shows the problem that the QONNs are trying to solve, a cart on a bounded one-dimensional track with an inverted pendulum on the top.

FIGS. 6A-6C illustrate simulation of a cart moving on a one dimensional frictionless track, with a pole on a hinge attached to its top (see FIG. 6C inset). At the beginning of the simulation, the cart is initialized to a random position, with the pole at a random angle. At each time-step, the neural network receives four values: the position of the cart x, its velocity $\dot{x}$, the angle of the pole with respect to the track θ, and the time derivative of that angle $\dot{\theta}$. From those four values, the neural network determines whether to apply a force of unit magnitude either in the +x or −x directions; those are the only two options. Each run of the simulation continues until a boundary condition in x, θ, or t ($t_{max}$=300) is reached (i.e., the cart runs into the edge of the track or the pole falls over). The number of time steps before failure is the fitness of that run and should be as large as possible for a successful simulation.

FIG. 6A shows an architecture for a directly-encoded reinforcement learning QONN 600. Each observation variable (x, $\dot{x}$, θ, and $\dot{\theta}$) was mapped to a phase $\gamma \in [0, \pi/2]$, and the corresponding dual-rail encoded input qubit was set to $\sin(\gamma)|0\rangle_L + \cos(\gamma)|1\rangle_L$. Each Θ layer 622 is an independent arbitrary unitary transformation; the gray boxes layers 622 represent single site nonlinearities 624.

FIG. 6B shows an architecture for the QRAM-encoded reinforcement learning QONN 650 with alternating Θ layers 672 and single site nonlinearities 674. In the QRAM architecture 650, the observation values were mapped to phases as in the direct architecture 600, which were then encoded onto a uniform quantum state over two qubits, a type of quantum random access memory (QRAM) encoding. At present, it is unknown in general how to efficiently encode a given state into a QRAM, but this numerical simulation demonstrates that QONNs can learn from general, highly entangled, quantum states, not just those with direct classical analogues.

Both encodings were performed by first compressing each of the four observation variables into $\gamma_j \in [0, \pi/2]$ (j∈{1 . . . 4}). For the direct encoding, each qubit $q_j$ is set to $\sin(\gamma_j)|0\rangle_L + \cos(\gamma_j)|1\rangle_L$. For the QRAM encoding, the state over the two input qubits was set to (¼)[exp($i\gamma_1$)|00⟩$_L$+exp($i\gamma_2$)|01⟩$_L$+exp($i\gamma_3$)|10⟩$_L$+exp($i\gamma_4$)|11⟩$_L$]. Finally, the QRAM encoding is given an ancilla qubit to act as phase reference.

This qubit encoding is simply for ease of encoding; after this point, we no longer regarded the photons as qubits and simply measured the output state, potentially increasing the computational power of the system by providing a larger state space for photons in modes versus as qubits. For example, two qubits have a state space of four {00,01, 10, 11} and two photons in four modes have a state space of ten {00, 01, 02, 03, 11, 12, 13, 22, 23, 33} [mode of photon 1, mode of photon 2]. In both systems, the arbitrary measure is "number of photons in mode 1" vs. "number of photons in mode 2": if the number of photons in the first mode exceeds the number in the second mode, the force on the cart is in the −x direction; otherwise the force on the cart is in the +x direction. Finally, we trained these networks using an evolutionary strategies method, which is a way to update the weights of the QONN that involves testing many weights (e.g., by playing the cart pole game), take the best few (i.e., the weights which keep the pole balanced the longest), then generating a new set of weights based on the best weights.

FIG. 6C shows fitness versus training generation curves for five different training runs of each type of the reinforcement learning QONN. A higher fitness corresponds to a QONN that was able to keep the pole upright and the cart within the bounds for more time. The direct encoding has more parameters and hence is slower to train. Each cycle includes a batch size of 100 to determine the approximate gradient. The fitness is averaged over 80 distinct runs of the network at each $\vec{\Theta}$. Hyperparameters (layer depth, batch size, and averaging group) were tuned using linear sweeps. These values apply to both the direct and QRAM encodings. Fitness increases with training generation, meaning the QONN consistently learns to balance the pole for longer times as generation increases, i.e., the QONN generalizes examples it has previously seen to new instances of the problem.

To cross-check the QONN's performance, we trained equivalently sized classical networks, i.e., 4-neuron, 6-layer networks with constant width. Hidden layers had ReLU neurons while the final layer was a single sigmoid neuron to generate a probability $p \in (0,1)$ of applying force in the $-x$ direction. We used the same training strategy for the classical networks as for the QONNs and observed a comparable performance, with a mean fitness after 1000 generations in the classical case of 37.1 compared with 61.9 for the directly encoded QONN and 136.1 for the QRAM encoded QONN. The direct encoding took about 5000 generations to reach a comparable fitness as the QRAM. Both networks can likely be optimized, and one should be cautious in directly comparing the classical and quantum results. Nevertheless, these results show that a QONN can learn on physically relevant data.

QONN-Based One-Way Quantum Repeaters

A QONN can also be used as a one-way quantum repeater. This takes advantage of both the flexibility of QONNs and of the ability to co-design the architecture and the physical platform. A one-way quantum repeater is equivalent to forward error correction in classical communications: it distributes information over several symbols in such a way that even if errors occur, the original information can still be recovered. In quantum optics, the primary error mechanism is loss, so a single qubit of information should be encoded across n photons such that if $m \leq k$ photons are lost (for a k-loss tolerant code), the state can be repaired without round trip communications between the sender and the receiver. Loss correction techniques are useful both for quantum communications over distance and protecting qubits in photonic quantum computing schemes.

FIG. 7A shows a quantum communications link with learning one-way quantum repeaters 700 between a transmitter (Alice) and a receiver (Bob). The one-way quantum repeaters 700 are implemented using properly trained QONNs and correct photon loss on logically encoded qubits $|\psi\rangle_L$ sent through a lossy channel with transmissivity $\eta$ from Alice to Bob. The QONN can be trained to implement the repeater 700 with the addition of ancillary photons and modes.

The QONN-based one-way quantum repeaters 700 in FIG. 7A are unitary one-way quantum repeaters which do not require measurements or quantum memories. While Hamiltonians for one-way quantum repeaters do exist, the question of how to realize these with physical components remains open. Here, the QONN architecture is trained to implement a quantum repeater schemes, demonstrating the utility of physically realizable variational quantum architectures.

Consider the two-mode code $|0\rangle_L = (|40\rangle_{12} + |04\rangle_{12})/\sqrt{2}$ $|1\rangle_L = |22\rangle_{12}$ which is robust against single photon loss. For an input state $|\psi\rangle_L = \alpha|0\rangle_L + \beta|1\rangle_L$, the loss of a single photon can be corrected by a system $\hat{S}$ that coherently performs the map $\hat{S}|30\rangle_{12} = (|40\rangle_{12} + |04\rangle_{12})/\sqrt{2}$ $\hat{S}|03\rangle_{12} = (|40\rangle_{12} + |04\rangle_{12})/\sqrt{2}$ $\hat{S}|12\rangle_{12} = |22\rangle_{12}$ $\hat{S}|21\rangle_{12} = |22\rangle_{12}$ Mathematically, $\hat{S}[\hat{a}_1 \rho \hat{a}_1^\dagger]\hat{S}^\dagger = \rho$ and $\hat{S}[\hat{a}_2 \rho \hat{a}_2^\dagger]\hat{S}^\dagger = \rho$, where $\rho = |\psi\rangle_{L\ L}\langle\psi|$. By photon number preservation, $\hat{S}$ cannot be unitary on two modes, but $\hat{S}$ can be realized as a unitary with additional ancilla. To train the QONN to implement this mapping, let $\{|\psi\rangle_L\}_i$ be the set of states $\{|0\rangle_L, |1\rangle_L, (|0\rangle_L + |1\rangle_L)/\sqrt{2}, (|0\rangle_L - |1\rangle_L)/\sqrt{2}, (|0\rangle_L - i|1\rangle_L)/\sqrt{2}\}$ and let $\sigma_{i,j} = \hat{a}_j \rho_i \hat{a}_j^\dagger$. The action of $\hat{S}$ on the computational (non-ancilla) modes with single photon loss is given by $\sigma_{i,j}^{(out)} = Tr_A[\hat{S}(\sigma_{i,j} \otimes \rho_A)\hat{S}^\dagger]$ where $\rho_A$ is the input ancilla state. In the lossless case, the output is given by $\rho_i^{(out)} = Tr_A[\hat{S}(\rho_i \otimes \rho_A)\hat{S}^\dagger]$.

The desired system should be able to correct inputs that have single photon-loss error and also leave the input undisturbed if there is no photon loss. This corresponds to the map $\sigma_{i,j}^{(out)} = \rho_i^{(out)} = \rho_i \forall i,j$.

Numerically, we calculated a cost function quantifies the average distance (given by the Hilbert-Schmidt inner product $Tr[A^\dagger B]$) between the six photon subtracted states and non-photon subtracted states, and variationally optimized the QONN. Due to the complexity of the system, we developed a back-propagation training method and used gradient-based optimization methods to achieve efficient and accurate training.

FIG. 7B is a plot of the average fidelity of a one-way quantum repeater's output states against the number of nonlinear layers (single-photon nonlinearity layers) of the QONN, reaching numerical precision at 50 nonlinear layers. The average fidelities were derived from numerical simulation of a (m, n)=(4,2) code, which corrects single photon loss. In conclusion, the QONN yields an explicit optical construction of a one-way quantum repeater which was otherwise unknown.

Computational Techniques for QONN Simulations

The quantum optics simulations above were performed with custom, optimized code written in Python, with performance-sensitive sections translated to Cython. The Numba library was used to GPU accelerate some large operations. The most computationally intensive step was the calculation of the multi-photon unitary transform ($U(\vec{\theta}_i)$ in Eq. (1)) from the single photon unitary. The multi-photon unitary has $$\binom{n+m-1}{n}^2$$

entries, each of which involves calculating the permanent of an n×n matrix.

As with classical neural networks, different optimization algorithms perform better for different tasks. We used gradient-free optimization techniques that optimized an objective function without an explicitly defined derivative (or one based on finite difference methods), as computing and backpropagating the gradient through the system may require knowledge of the internal quantum state of the system, preventing efficient in situ training. While this might be acceptable for designing small systems in simulation (say, designing quantum gates), it may not allow for systems to be variationally trained in situ.

Results show that the BOBYQA algorithm performs well for most applications in terms of speed and accuracy for our QONN and is available in the NLopt library. Calculation of such a gradient is possible with classical optical neural networks. For the quantum reinforcement learning simulations, we used our own implementation of evolutionary strategies. At each stage, our evolutionary strategy took a vector parameterizing the network, generates a population of new vectors by repeatedly perturbing the vector with gaussian noise, then calculates a fitness for each perturbed vector. The new vector was then the fitness-weighted average of all the perturbed vectors. Evolutionary strategies do not require backpropagation, in comparison to strategies based on Markov decision processes, and so are more suitable for quantum applications.

QONNs for Classical Optical Neural Networks

A QONN architecture can also implement a classical optical neural network and is therefore suitable for classical inference tasks. While neural networks typically use an arbitrary matrix of real numbers for the linear transform (as opposed to a unitary matrix which the QONN implements), an n-dimensional non-unitary operation can be embedded across a 2n-mode optical circuit. Moreover, unitary matrices are also suitable for classical neural networks, avoiding the vanishing (or exploding) gradient problem.

The Kerr interaction is also suitable as the nonlinear activation function for optical neural networks by demonstrating a nonlinear response in the average photon number of an incident coherent state. To see this consider the configuration shown in FIG. 8 with a single mode Kerr nonlinearity $$\Sigma(\phi) = \sum_{n=0}^{\infty} e^{in(n-1)\phi/2} |n\rangle\langle n|$$

in each arm of a Mach-Zehnder interferometer, with phase shifts of equal strength but opposite sign. Such a setup can be achieved via atomic systems.

Figure 8:
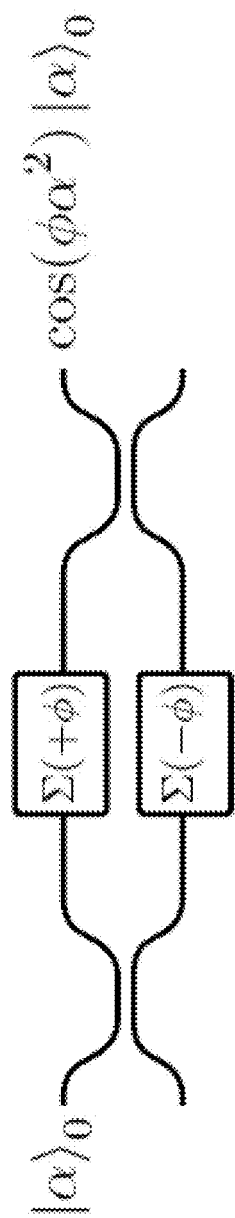
FIG. 8 shows a nonlinear activation function, in the form of two single-mode Kerr interactions of opposite phase in a Mach-Zehnder interferometer configuration, implemented by a QONN.

To demonstrate the QONN is capable of implementing a nonlinear activation function, consider two single-mode Kerr interactions of opposite phase in a Mach-Zehnder interferometer configuration as shown in FIG. 8. Injecting a coherent state $|\psi\rangle = |\alpha\rangle_0$ with average photon number $|\alpha|^2$ into the top arm of the interferometer (where the subscript 0 (1) indexes the top (bottom) mode) transforms to $$|\psi\rangle = |\alpha/\sqrt{2}\rangle_0 |\alpha/\sqrt{2}\rangle_1$$

After passing through the Kerr region the state becomes $$|\psi\rangle \approx |\exp(i\phi\alpha^2)\alpha/\sqrt{2}\rangle_0 |\exp(-i\phi\alpha^2)\alpha/\sqrt{2}\rangle_1$$

After the final beam splitter in FIG. 8, the state of light in the first mode becomes $$|\psi\rangle \approx \tfrac{1}{2}[\exp(i\phi\alpha^2) + \exp(-i\phi\alpha^2)]|\alpha\rangle_0$$

$$|\psi\rangle \approx \cos(\phi\alpha^2)|\alpha\rangle_0$$

The average photon number $|\alpha|^2$ therefore varies nonlinearly as $|\cos(\phi\alpha^2)\alpha|^2$. While neural networks typically use only handful of nonlinear activation functions (such as ReLU or sigmoid), many other functions are also suitable, including sinusoidal functions. Thus, the QONN can implement classical neural networks and perform inference on either classical or quantum optical data.

Reduced Strength Nonlinearities

To investigate the effects of nonlinearities with $\phi < \pi$, we investigated the case where the total nonlinearity seen through the system is still $\pi$ but each layer has a nonlinearity $\phi < \pi$. For higher layer counts, the training is slower—likely due to the higher number of free parameters—but with less variation in the final error compared with a smaller number of layers. In the simulations above, the nonlinearities have a strength $\pi$ because they seemed to train most efficiently for the problems being addressed. However, as a full $\pi$ nonlinearity can be a challenging experimental task, the question of what can be accomplished with smaller nonlinearity strengths is of interest.

Figure 9:
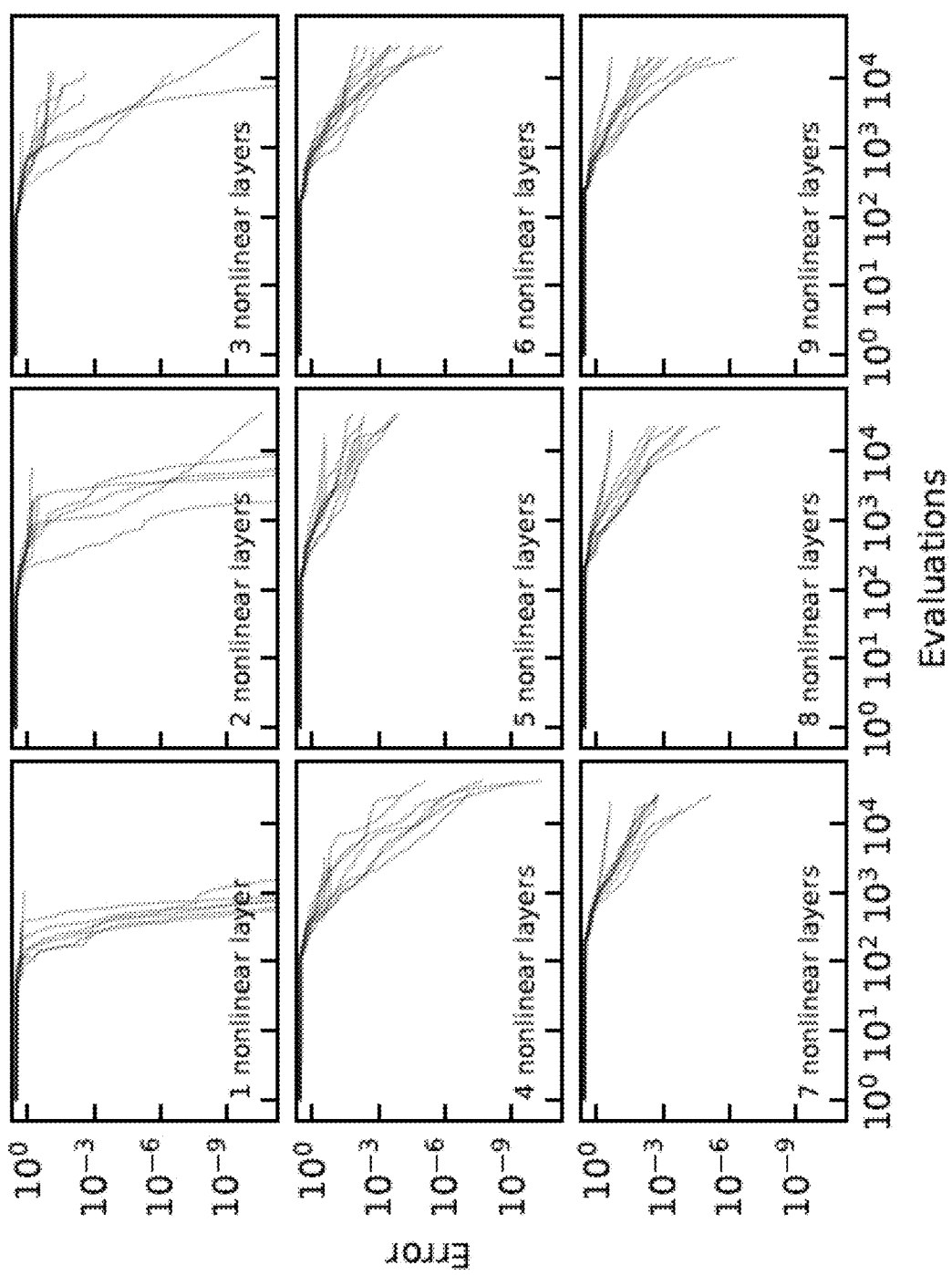
FIG. 9 illustrates CNOT training of a QONN with $\phi=\pi/N_{layers}$.

FIG. 9 shows numerical simulations for nonlinearities of strength $\pi/N$ and in networks with N nonlinear layers, such that the total nonlinearity seen by each photon through the whole network is equal to $\pi$. More specifically, FIG. 9 shows the training error of a QONN CNOT gate versus function evaluation where each layer in the QONN has a nonlinearity of strength $\phi = \pi/N$ where N is the total number of layers in the QONN. That is, each photon passing through the QONN experiences a total nonlinearity of $\pi$, but that nonlinearity is split over more and more sites. Such a QONN might be useful in cases where single nonlinearities do not reach $\phi = \pi$ but many layers are available. FIG. 9 shows that it is sometimes easier to train systems with a small number of layers, but other times the optimization finds a non-optimal local minimum. For higher layer counts, the optimization does not converge as rapidly with iteration number, but the optimization runs perform similarly (i.e., the optimizations do not find bad local minima, as they did for small layer counts).

Figure 10:
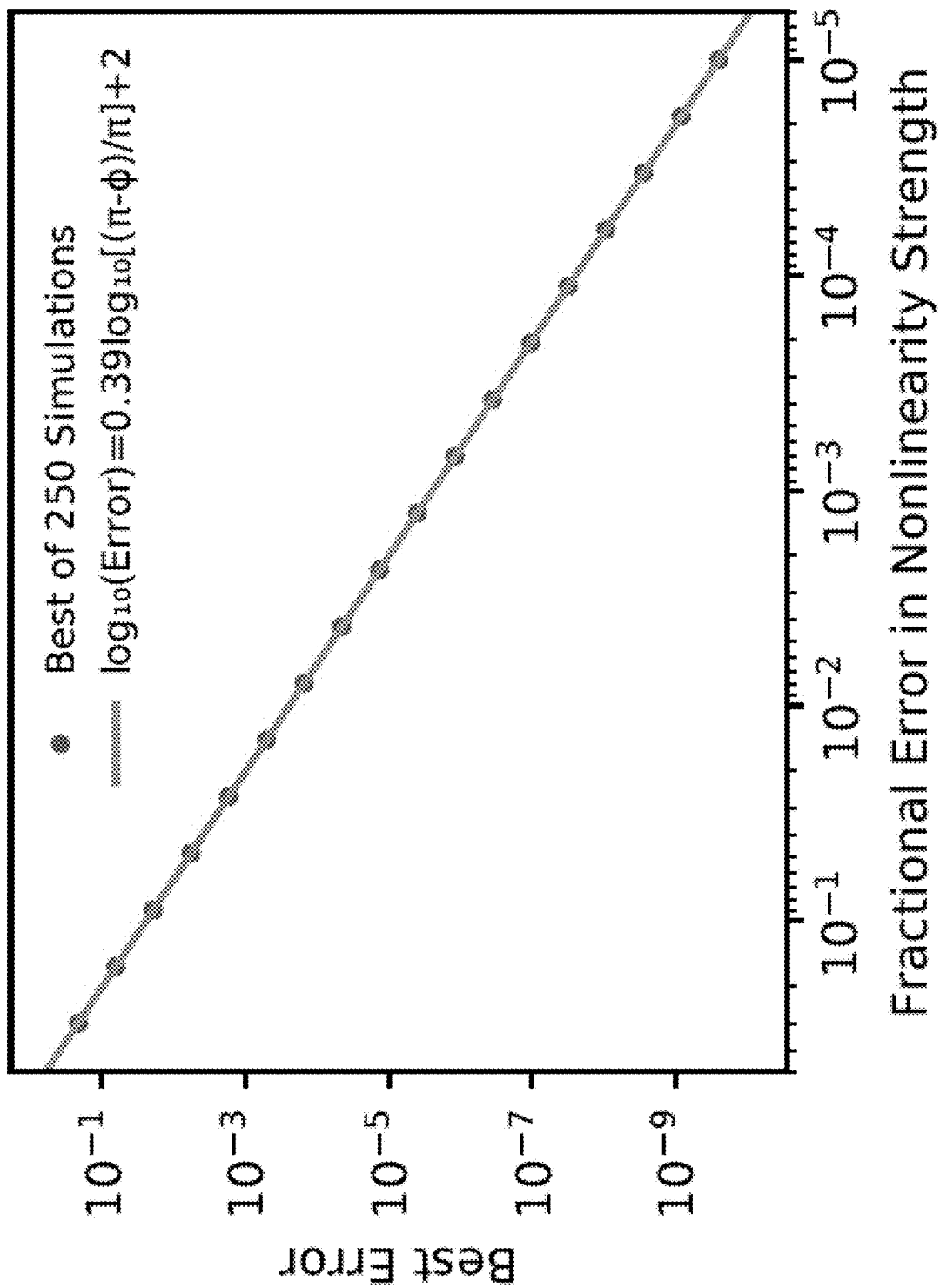
FIG. 10 is a plot of best achieved CNOT fidelity versus infidelity in π for 250 single-nonlinear-layer QONNs at each potential φ.

FIG. 10 shows the maximum fidelity achievable with a single layer of strength less than $\pi$. More specifically, FIG. 10 shows the performance of a QONN CNOT gate when the available nonlinearities have $\phi < \pi$ and the QONN has a single layer system (i.e., two unitaries sandwiching a single nonlinear layer). The plot is of the lowest possible error in the resulting CNOT gate over 250 simulations at each value of $\phi$. This relationship is log-linear with respect to the fractional error in $\phi$ relative to $\pi$.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method comprising:
coupling single photons from an array of single-photon sources into a plurality of neural network layers, the plurality of neural network layers comprising alternating arrays of interconnected optical switches and arrays of single-photon nonlinearities;
performing respective linear operations on the single photons at each of the arrays of interconnected optical switches;
performing respective nonlinear operations on the single photons at each of the arrays of single-photon nonlinearities; and
detecting the single photons emitted by the plurality of neural network layers with an array of single-photon detectors.

2. The method of claim 1, further comprising:
emitting the single photons from an array of heralded spontaneous single-photon sources.

3. The method of claim 1, further comprising:
emitting the single photons from an array of deterministic single-photon sources.

4. The method of claim 1, wherein performing the respective linear operations comprises performing at least ten linear operations and performing the respective nonlinear operations comprises at least nine nonlinear operations.

5. The method of claim 1, wherein performing the respective linear operations comprises performing respective arbitrary unitary operations.

6. The method of claim 1, wherein performing the respective nonlinear operations comprises imparting a phase shift depending on a photon-number of photons incident on a single-photon nonlinearity in one array of single-photon nonlinearities.

7. The method of claim 6, wherein the phase shift is equal to $\pi$ divided by a number of nonlinear layers in the plurality of neural network layers.

8. The method of claim 1, wherein performing the respective nonlinear operations comprises illuminating a defect center or quantum dot with one of the single photons.

9. The method of claim 1, wherein performing the respective nonlinear operations comprises coupling one of the single photons into a cavity.

10. The method of claim 1, further comprising:
trimming phases of the single photons with an array of phase shifters.

11. A quantum optical neural network comprising:
an array of single-photon sources to emit single photons;
a plurality of neural network layers, in optical communication with the array of single-photon sources, to perform a neural network operation on the single photons, the plurality of neural network layers comprising alternating arrays of interconnected optical switches to perform respective linear operations on the single photons and arrays of single-photon nonlinearities to perform respective nonlinear operations on the single photons; and
an array of single-photon detectors, in optical communication with the plurality of neural network layers, to detect the single photons,
wherein each of the respective nonlinear operations comprises a phase shift that varies nonlinearly on a photon-number of photons incident on a corresponding single-photon nonlinearity in one of the arrays of single-photon nonlinearities.

12. The quantum optical neural network of claim 11, wherein the array of single-photon sources comprises an array of heralded spontaneous single-photon sources.

13. The quantum optical neural network of claim 11, wherein the array of single-photon sources comprises an array of deterministic single-photon sources.

14. The quantum optical neural network of claim 11, wherein the plurality of neural network layers comprises at least five neural network layers.

15. The quantum optical neural network of claim 11, wherein the plurality of neural network layers comprises an array of phase shifters, in optical communication with at least array of interconnected optical switches, to trim phases of the single photons.

16. The quantum optical neural network of claim 11, wherein the respective linear operations are respective arbitrary unitary operations.

17. The quantum optical neural network of claim 11, wherein the phase shift is $\pi$.

18. The quantum optical neural network of claim 11, wherein the phase shift is equal to $\pi$ divided by a number of nonlinear layers in the plurality of neural network layers.

19. The quantum optical neural network of claim 11, wherein at least one array of single-photon nonlinearities comprises an array of defect centers or quantum dots.

20. The quantum optical neural network of claim 11, wherein at least one array of single-photon nonlinearities comprises an array of cavity-based nonlinearities.

* * * * *